(12) United States Patent
Yang et al.

(10) Patent No.: US 12,010,718 B2
(45) Date of Patent: Jun. 11, 2024

(54) QUALITY OF SERVICE CONFIGURATIONS FOR RADIO BEARERS WITH MULTIPLE DATA FLOWS

(71) Applicant: QUALCOMM Incorporated, San Diego, CA (US)

(72) Inventors: Yue Yang, San Diego, CA (US); Srinivasan Balasubramanian, San Diego, CA (US); Aziz Gholmieh, Del Mar, CA (US); Yu-Ting Yu, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 17/158,812

(22) Filed: Jan. 26, 2021

(65) Prior Publication Data
US 2021/0153221 A1 May 20, 2021

Related U.S. Application Data

(62) Division of application No. 15/933,145, filed on Mar. 22, 2018, now Pat. No. 10,917,901.
(Continued)

(51) Int. Cl.
*H04W 72/12* (2023.01)
*H04W 24/08* (2009.01)
(Continued)

(52) U.S. Cl.
CPC ......... *H04W 72/542* (2023.01); *H04W 24/08* (2013.01); *H04W 28/24* (2013.01); *H04W 76/10* (2018.02); *H04W 24/10* (2013.01)

(58) Field of Classification Search
CPC . H04W 72/1231; H04W 76/10; H04W 24/08; H04W 28/24; H04W 24/10
See application file for complete search history.

(56) References Cited

U.S. PATENT DOCUMENTS 7,929,974 B1 4/2011 Walters
8,908,636 B2 12/2014 Klingenbrunn et al.
(Continued)

FOREIGN PATENT DOCUMENTS

CN 104301250 A 1/2015
EP 2141870 A2 1/2010
(Continued)

OTHER PUBLICATIONS

Taiwan Search Report—TW107109994—TIPO—dated Aug. 27, 2021.
(Continued)

*Primary Examiner* — Awet Haile
(74) *Attorney, Agent, or Firm* — Holland & Hart LLP

(57) ABSTRACT

Methods, systems, and devices for wireless communication are described. A wireless communications system may establish radio bearers for certain data transmissions between a user equipment (UE) and a base station. A radio bearer may be associated with one or more quality of services (QoS) parameters, such as a bit rate. The base station may indicate to the UE a time window over which to average the bit rate. In some examples, a radio bearer may include multiple data flows. The base station may provide information regarding QoS parameters for each data flow in control signaling, such as a grant.

17 Claims, 18 Drawing Sheets

Related U.S. Application Data

(60) Provisional application No. 62/475,731, filed on Mar. 23, 2017.

(51) Int. Cl.
    *H04W 28/24*     (2009.01)
    *H04W 72/542*     (2023.01)
    *H04W 76/10*     (2018.01)
    *H04W 24/10*     (2009.01)

(56) References Cited

U.S. PATENT DOCUMENTS

| | | |
|---|---|---|
| 9,674,850 B2* | 6/2017 | Tian .................. H04W 72/087 |
| 2002/0114306 A1 | 8/2002 | Kuusinen et al. |
| 2004/0038691 A1 | 2/2004 | Shin |
| 2004/0166836 A1 | 8/2004 | Kadowaki |
| 2004/0213170 A1 | 10/2004 | Bremer |
| 2005/0277422 A1 | 12/2005 | Baker et al. |
| 2006/0056432 A1* | 3/2006 | Azarov .................. H04L 47/56 |
| | | 370/412 |
| 2006/0209694 A1 | 9/2006 | Chandhok et al. |
| 2010/0120459 A1 | 5/2010 | Delaval |
| 2012/0099515 A1 | 4/2012 | Chen et al. |
| 2012/0209978 A1 | 8/2012 | Cho et al. |
| 2014/0321288 A1* | 10/2014 | Ha ........................ H04L 47/32 |
| | | 370/237 |
| 2015/0156658 A1* | 6/2015 | Zhang .................. H04W 24/10 |
| | | 370/252 |
| 2015/0264596 A1 | 9/2015 | Franklin et al. |
| 2016/0020968 A1 | 1/2016 | Aumann et al. |
| 2016/0197846 A1* | 7/2016 | Bernstein ................ H04B 3/00 |
| | | 375/222 |
| 2016/0262100 A1 | 9/2016 | Larsson et al. |
| 2016/0374100 A1 | 12/2016 | Das et al. |
| 2017/0150394 A1 | 5/2017 | Fan et al. |
| 2017/0359749 A1* | 12/2017 | Dao .................... H04L 47/2416 |
| 2018/0041906 A1 | 2/2018 | Jang et al. |
| 2018/0279336 A1 | 9/2018 | Yang et al. |
| 2019/0356453 A1* | 11/2019 | Li .......................... H04W 4/12 |

FOREIGN PATENT DOCUMENTS

| | | |
|---|---|---|
| EP | 1665579 B1 | 2/2010 |
| EP | 2672752 A1 | 12/2013 |
| WO | WO-2008133185 A1 | 11/2008 |
| WO | WO-2009146726 A1 | 12/2009 |
| WO | WO-2010029827 A1 | 3/2010 |
| WO | WO-2011162783 A1 | 12/2011 |

OTHER PUBLICATIONS

International Search Report and Written Opinion—PCT/US2018/024034—ISA/EPO—dated Sep. 21, 2018.
Partial International Search Report—PCT/US2018/024034—ISA/EPO—dated Jun. 21, 2018.

\* cited by examiner

QUALITY OF SERVICE CONFIGURATIONS FOR RADIO BEARERS WITH MULTIPLE DATA FLOWS

CROSS REFERENCES

The present Application for Patent is a Divisional of U.S. patent application Ser. No. 15/933,145 by Yang et al., entitled "Quality of Service Configurations For Radio Bearers With Multiple Data Flows" filed Mar. 22, 2018, which claims priority to U.S. Provisional Patent Application No. 62/475,731 by Yang et al., entitled "Quality of Service Configurations For Radio Bearers With Multiple Data Flows," filed Mar. 23, 2017, assigned to the assignee hereof.

BACKGROUND

The following relates generally to wireless communication and more specifically to quality of service configurations for radio bearers with multiple data flows.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some examples, a wireless multiple-access communications system may include a number of base stations, each simultaneously supporting communication for multiple communication devices, otherwise known as UEs. In an LTE or LTE-Advanced (LTE-A) network, a set of one or more base stations may define an eNodeB (eNB). In other examples (e.g., in a next generation, NR, or 5G network), a wireless multiple access communications system may include a number of smart radio heads (radio heads) in communication with a number of access node controllers (ANCs), where a set of one or more radio heads, in communication with an ANC, defines a gNB.

A base station or radio head may be a part of a radio access network (RAN) in a wireless communications system. The RAN may communicate with a set of UEs on downlink channels (e.g., for transmissions from a base station or radio head to a UE) and uplink channels (e.g., for transmissions from a UE to a base station or radio head). A UE may establish a data connection with a data network, and a RAN may route packets sent from the data network to the UE (i.e., downlink) and packets sent from the UE to the data network (i.e., uplink).

A wireless communications system may configure a radio bearer for communications between a UE and a base station. The radio bearer may be associated with a quality of service (QoS) parameter. However, in some circumstances, there may be ambiguity regarding the QoS parameter or how the QoS parameter is measured. As a result, the UE or the base station may be unable to adjust traffic flow associated with the radio bearer based on the QoS parameter.

SUMMARY

A wireless communications system may establish radio bearers for certain data transmissions between a user equipment (UE) and a base station. A radio bearer may be associated with one or more quality of services (QoS) parameters, such as a bit rate. The base station may indicate to the UE a time window over which to average the bit rate. In some examples, a radio bearer may include multiple data flows. The base station may provide information regarding QoS parameters for each data flow in control signaling, such as a grant.

A method of for wireless communication is described. The method may include establishing a radio bearer with a network entity, identifying a QoS bit rate associated with the radio bearer, and receiving an indication of a time window over which the QoS bit rate is averaged.

An apparatus for wireless communication is described. The apparatus may include means for establishing a radio bearer with a network entity, means for identifying a QoS bit rate associated with the radio bearer, and means for receiving an indication of a time window over which the QoS bit rate is averaged.

Another apparatus for wireless communication is described. The apparatus may include a processor, memory in electronic communication with the processor, and instructions stored in the memory. The instructions may be operable to cause the processor to establish a radio bearer with a network entity, identify a QoS bit rate associated with the radio bearer, and receive an indication of a time window over which the QoS bit rate is averaged.

A non-transitory computer readable medium for wireless communication is described. The non-transitory computer-readable medium may include instructions operable to cause a processor to establish a radio bearer with a network entity, identify a QoS bit rate associated with the radio bearer, and receive an indication of a time window over which the QoS bit rate is averaged.

In some examples of the method, apparatus, and non-transitory computer-readable medium described above, receiving the indication includes receiving a duration of the time window.

In some examples of the method, apparatus, and non-transitory computer-readable medium described above, receiving the indication includes receiving a start frame of the time window and a stop frame of the time window.

In some examples of the method, apparatus, and non-transitory computer-readable medium described above, receiving the indication includes receiving the indication via radio resource control (RRC) signaling.

In some examples of the method, apparatus, and non-transitory computer-readable medium described above, receiving the indication includes receiving the indication via a media access control (MAC) control element (CE).

Some examples of the method, apparatus, and non-transitory computer-readable medium described above may further include processes, features, means, or instructions for identifying a plurality of configured data flows associated with the radio bearer. Some examples of the method, apparatus, and non-transitory computer-readable medium described above may further include processes, features, means, or instructions for identifying a different QoS bit rate associated with each configured data flow of the plurality of configured data flows, where the indication includes a different time window over which each different QoS bit rate may be averaged.

Some examples of the method, apparatus, and non-transitory computer-readable medium described above may further include processes, features, means, or instructions for transmitting a request for an indication of an instantaneous bit rate associated with at least one of the plurality of configured data flows. Some examples of the method, apparatus, and non-transitory computer-readable medium described above may further include processes, features, means, or instructions for receiving the indication of the instantaneous bit rate in response to the request.

Some examples of the method, apparatus, and non-transitory computer-readable medium described above may further include processes, features, means, or instructions for transmitting a request for an indication of the time window associated with at least one of the plurality of configured data flows. Some examples of the method, apparatus, and non-transitory computer-readable medium described above may further include processes, features, means, or instructions for receiving the indication of the time window in response to the request.

Some examples of the method, apparatus, and non-transitory computer-readable medium described above may further include processes, features, means, or instructions for scheduling and predicting data traffic associated with the radio bearer based on the QoS bit rate and the time window.

A method of for wireless communication is described. The method may include establishing a radio bearer with a UE, identifying a QoS bit rate associated with the radio bearer, and transmitting an indication of a time window over which the QoS bit rate is averaged.

An apparatus for wireless communication is described. The apparatus may include means for establishing a radio bearer with a UE, means for identifying a QoS bit rate associated with the radio bearer, and means for transmitting an indication of a time window over which the QoS bit rate is averaged.

Another apparatus for wireless communication is described. The apparatus may include a processor, memory in electronic communication with the processor, and instructions stored in the memory. The instructions may be operable to cause the processor to establish a radio bearer with a UE, identify a QoS bit rate associated with the radio bearer, and transmit an indication of a time window over which the QoS bit rate is averaged.

A non-transitory computer readable medium for wireless communication is described. The non-transitory computer-readable medium may include instructions operable to cause a processor to establish a radio bearer with a UE, identify a QoS bit rate associated with the radio bearer, and transmit an indication of a time window over which the QoS bit rate is averaged.

In some examples of the method, apparatus, and non-transitory computer-readable medium described above, transmitting the indication includes transmitting a duration of the time window.

In some examples of the method, apparatus, and non-transitory computer-readable medium described above, transmitting the indication includes transmitting a start frame of the time window and a stop frame of the time window.

In some examples of the method, apparatus, and non-transitory computer-readable medium described above, transmitting the indication includes transmitting the indication via RRC signaling.

In some examples of the method, apparatus, and non-transitory computer-readable medium described above, transmitting the indication includes transmitting the indication via a MAC CE.

Some examples of the method, apparatus, and non-transitory computer-readable medium described above may further include processes, features, means, or instructions for identifying a plurality of configured data flows associated with the radio bearer. Some examples of the method, apparatus, and non-transitory computer-readable medium described above may further include processes, features, means, or instructions for identifying a different QoS bit rate associated with each configured data flow of the plurality of configured data flows, where the indication includes a different time window over which each different QoS bit rate may be averaged.

Some examples of the method, apparatus, and non-transitory computer-readable medium described above may further include processes, features, means, or instructions for receiving a request for an indication of an instantaneous bit rate associated with at least one of the plurality of configured data flows. Some examples of the method, apparatus, and non-transitory computer-readable medium described above may further include processes, features, means, or instructions for transmitting the indication of the instantaneous bit rate in response to the request.

Some examples of the method, apparatus, and non-transitory computer-readable medium described above may further include processes, features, means, or instructions for receiving a request for an indication of the time window associated with at least one of the plurality of configured data flows. Some examples of the method, apparatus, and non-transitory computer-readable medium described above may further include processes, features, means, or instructions for transmitting the indication of the time window in response to the request.

Some examples of the method, apparatus, and non-transitory computer-readable medium described above may further include processes, features, means, or instructions for scheduling and predicting data traffic associated with the radio bearer based on the QoS bit rate and the time window.

A method of for wireless communication is described. The method may include establishing a radio bearer with a network entity, identifying a plurality of configured data flows associated with the radio bearer, and receiving a grant from the network entity comprising a QoS parameter for each configured data flow of the plurality of configured data flows.

An apparatus for wireless communication is described. The apparatus may include means for establishing a radio bearer with a network entity, means for identifying a plurality of configured data flows associated with the radio bearer, and means for receiving a grant from the network entity comprising a QoS parameter for each configured data flow of the plurality of configured data flows.

Another apparatus for wireless communication is described. The apparatus may include a processor, memory in electronic communication with the processor, and instructions stored in the memory. The instructions may be operable to cause the processor to establish a radio bearer with a network entity, identify a plurality of configured data flows associated with the radio bearer, and receive a grant from the network entity comprising a QoS parameter for each configured data flow of the plurality of configured data flows.

A non-transitory computer readable medium for wireless communication is described. The non-transitory computer-readable medium may include instructions operable to cause a processor to establish a radio bearer with a network entity, identify a plurality of configured data flows associated with the radio bearer, and receive a grant from the network entity comprising a QoS parameter for each configured data flow of the plurality of configured data flows.

In some examples of the method, apparatus, and non-transitory computer-readable medium described above, receiving the grant includes receiving an allocation of bits for a first configured data flow of the plurality of configured data flows and an allocation of bits for a second configured data flow of the plurality of configured data flows.

In some examples of the method, apparatus, and non-transitory computer-readable medium described above, the allocation of bits for the first configured data flow may be configured to satisfy a first QoS priority level, and where the allocation of bits for the second configured data flow may be configured to satisfy a second QoS priority level that may be lower than the first QoS priority level.

In some examples of the method, apparatus, and non-transitory computer-readable medium described above, the first QoS priority level includes a guaranteed bit rate (GBR) and the second QoS priority level includes a non-GBR.

A method of for wireless communication is described. The method may include establishing a radio bearer with a UE, identifying a plurality of configured data flows associated with the radio bearer, and transmitting a grant to the UE comprising a QoS parameter for each configured data flow of the plurality of configured data flows.

An apparatus for wireless communication is described. The apparatus may include means for establishing a radio bearer with a UE, means for identifying a plurality of configured data flows associated with the radio bearer, and means for transmitting a grant to the UE comprising a QoS parameter for each configured data flow of the plurality of configured data flows.

Another apparatus for wireless communication is described. The apparatus may include a processor, memory in electronic communication with the processor, and instructions stored in the memory. The instructions may be operable to cause the processor to establish a radio bearer with a UE, identify a plurality of configured data flows associated with the radio bearer, and transmit a grant to the UE comprising a QoS parameter for each configured data flow of the plurality of configured data flows.

A non-transitory computer readable medium for wireless communication is described. The non-transitory computer-readable medium may include instructions operable to cause a processor to establish a radio bearer with a UE, identify a plurality of configured data flows associated with the radio bearer, and transmit a grant to the UE comprising a QoS parameter for each configured data flow of the plurality of configured data flows.

In some examples of the method, apparatus, and non-transitory computer-readable medium described above, transmitting the grant includes: transmitting an allocation of bits for a first configured data flow of the plurality of configured data flows and an allocation of bits for a second configured data flow of the plurality of configured data flows.

In some examples of the method, apparatus, and non-transitory computer-readable medium described above, the allocation of bits for the first configured data flow may be configured to satisfy a first QoS priority level, and where the allocation of bits for the second configured data flow may be configured to satisfy a second QoS priority level that may be lower than the first QoS priority level.

In some examples of the method, apparatus, and non-transitory computer-readable medium described above, the first QoS priority level includes a GBR and the second QoS priority level includes a non-GBR.

DETAILED DESCRIPTION

A wireless communications network may be configured to handle data for a service in a prioritized manner to ensure certain quality of service (QoS) requirements associated with the service. For example, data associated with a service that requires low latency (e.g., voice over IP (VoIP)) may be given priority over data associated with a less latency-sensitive service (e.g., web browsing). A wireless communications network may establish a bearer to carry data traffic between entities of the network according to QoS requirements associated with the bearer. A QoS requirement may be characterized as a bit rate, such as a minimum bit rate or a maximum bit rate. However, because the instantaneous bit rate may vary over time, the average bit rate may depend on the window of time over which the bit rate is averaged.

In accordance with certain aspects of the disclosure, an indication of the window of time over which to average the bit rate may be signaled to a user equipment (UE) or some other entity of a wireless communications network. A UE may be able to use the window information to determine an average bit rate, which may in turn facilitate data traffic scheduling decisions or predictions by the UE or network.

A wireless communications network may also support a radio bearer that is configured with multiple separate data flows (e.g., QoS flows). In some examples, each data flow may be associated with a different QoS requirement. In accordance with aspects of the disclosure, information regarding the QoS requirement for each data flow of a radio bearer may be signaled to a UE in a control message, such as a grant.

Aspects of the disclosure are initially described in the context of wireless communications systems and a resource timing diagram. Aspects of the disclosure are further illustrated by and described with reference to apparatus diagrams, system diagrams, and flowcharts that relate to QoS configurations for radio bearers with multiple data flows.

Figure 1:
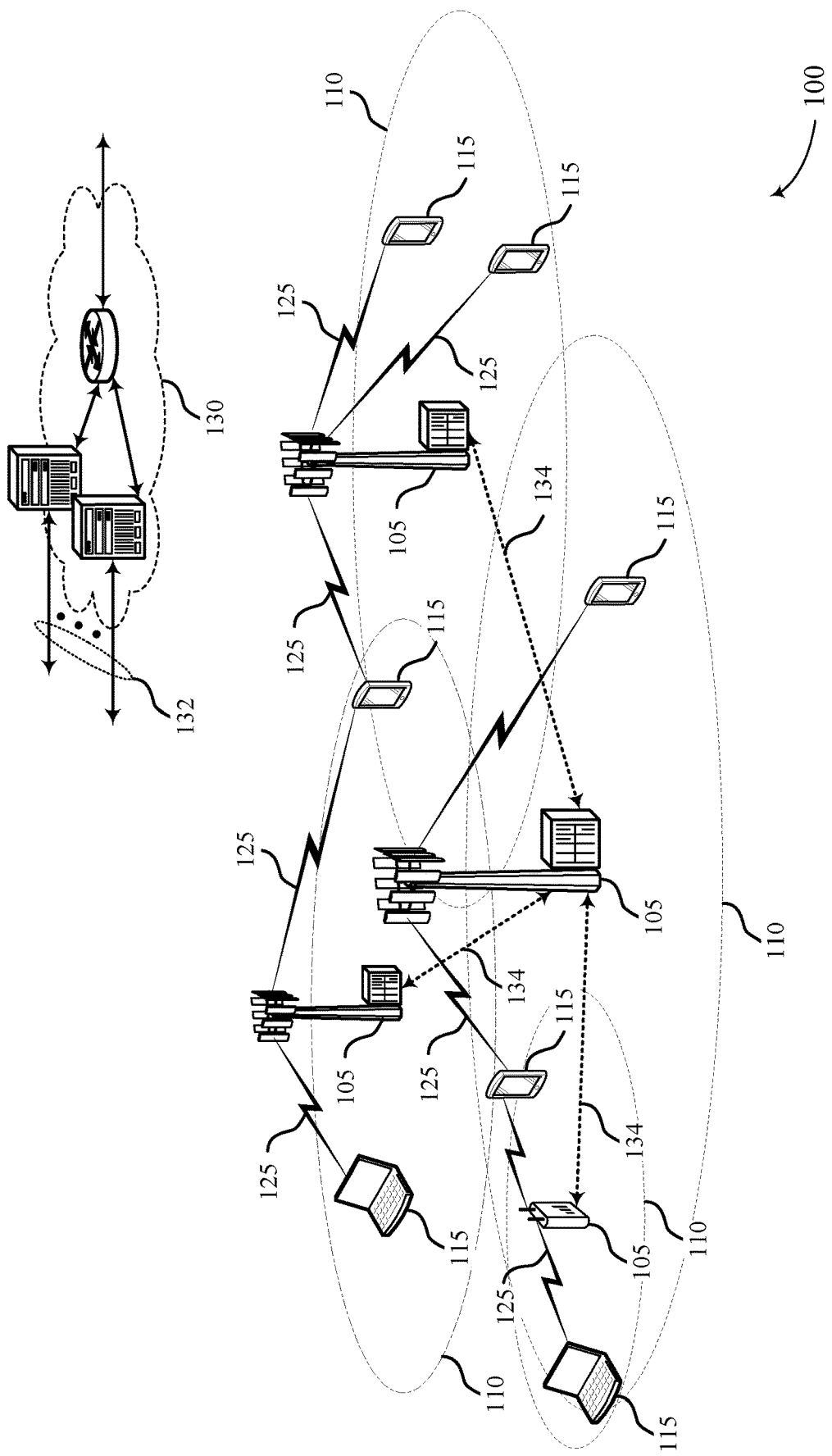
FIGS. 1 and 2 illustrate examples of wireless communications systems that support quality of service (QoS) configurations for radio bearers with multiple data flows in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. The wireless communications system 100 may also support QoS configurations for radio bearers with multiple data flows.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector) of a carrier or base station, depending on context.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

When a connection is established, core network 130 may associate QoS parameters with data flows supported by the connection. The QoS parameters may be associated with non-access stratum (NAS) QoS profiles (e.g., A or B type) that core network 130 may provide to a UE 115 and RAN. Wireless communication system 100 may support default QoS parameters, pre-authorized QoS parameters, and other QoS parameters established by core network 130 for specific QoS requirements for different services or applications. QoS parameters may include, for example, a maximum bit rate (MBR), a guaranteed bit rate (GBR), a priority level, a packet delay budget, a packet error rate, or an admission control. In some aspects, an access stratum (AS) may enforce, for example, a maximum bit rate limit in the uplink and downlink per UE for flows that do not require a GBR.

Wireless communication system 100 may support a connection (e.g., between a UE 115 and a base station 105) with a number of different data flows, where each data flow may have different QoS rules containing different QoS parameters. In some examples, such data flows may be referred to as a QoS flow. In some wireless systems, a radio bearer may be associated with a single evolved packet system (EPS) bearer, and a QoS configuration may be addressed to each specific radio bearer. Wireless communications system 100 may support addressing QoS information per QoS flow, such that multiple QoS flows may be mapped to one radio bearer.

Communication performance between a UE 115 and a base station 105 may be monitored and associated with QoS parameters such as bit rate, delay, or error rate. QoS parameters may be configured based on a type of radio bearer associated with the communication. A radio bearer may predict and schedule traffic behavior based on the guaranteed and maximum bit rates. However, communication performance and data rates may vary over differing windows of time. Thus, bit rate measurements made by the UE 115 may not reflect a total, average bit rate.

Accordingly, wireless communication system 100 may support techniques for QoS configurations for radio bearers with multiple data flows. That is, wireless communication system 100 may support techniques for providing a UE 115 with measurement window information such that the UE 115 may take accurate measurements of an average bit rate of a QoS flow associated with a radio bearer. Wireless communications system 100 may further support techniques for indicating QoS information for a specific QoS flow (e.g., of many QoS flows associated with a radio bearer) to the UE 115.

Figure 2:
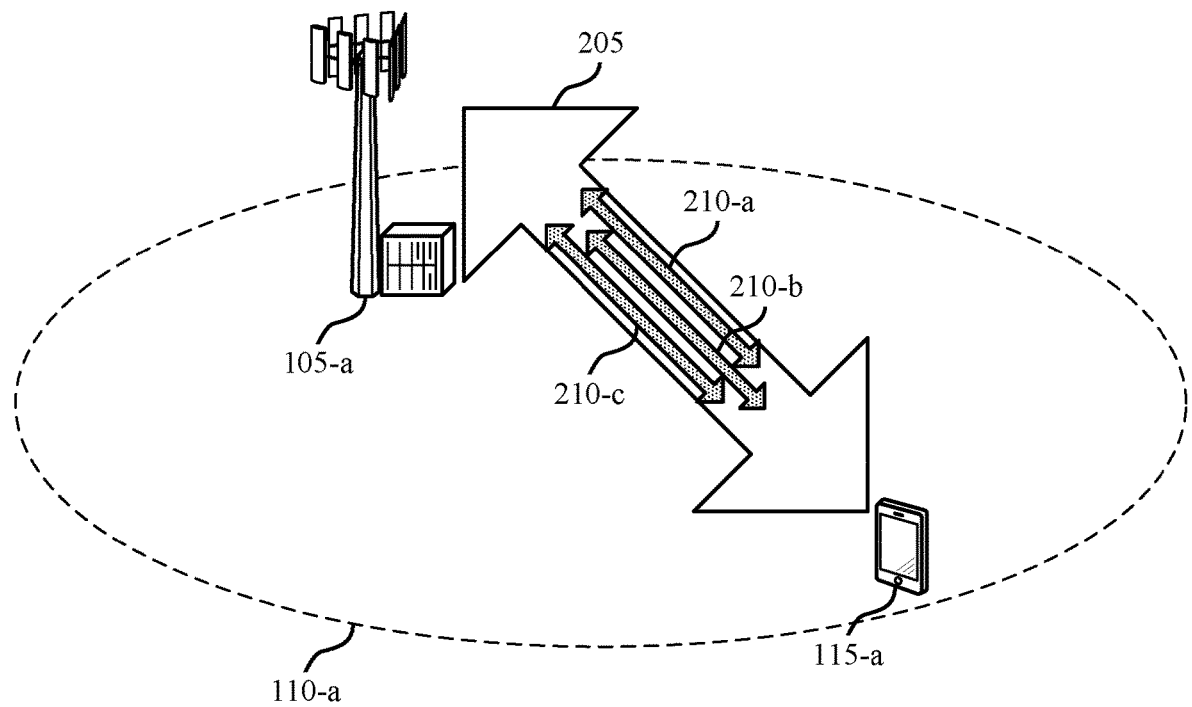

FIG. 2 illustrates an example of a wireless communications system 200 that supports QoS configurations for radio bearers with multiple data flows in accordance with various aspects of the present disclosure. Wireless communications system 200 may include UE 115-*a* and base station 105-*a*, which may be respective examples of a UE 115 and base station 105 as described herein. UE 115-*a* and base station 105-*a* may establish a communication link 205 for uplink and downlink transmissions. The communication link 205 may be configured with one or more radio bearers. In some examples, a radio bearer may include one or more communication links for data transmissions, referred to as data flows 210 (e.g., data flow 210-*a*, 210-*b*, and 210-*c*). A radio bearer may be associated with a QoS configuration or parameter (e.g., a bit rate). Additionally or alternatively, each data flow 210 may be associated with a different QoS configuration or parameter. A data flow 210 may be an example of a QoS flow. That is, multiple QoS flows may be mapped to a single radio bearer. In some examples, the base station 105-*a* may indicate information to the UE 115-*a* regarding how the QoS is measured or information regarding QoS parameters for the different data flows.

In some examples, a QoS parameter associated with a radio bearer or data flow 210 may include a bit rate. The base station 105-*a* may indicate to the UE 115-*a* some timing information to use for measuring an average bit rate over a duration. For example, the base station 105-*a* may indicate a measurement window over which to average the bit rate. The base station 105-*a* may indicate the measurement window explicitly or implicitly. For example, base station 105-*a* may indicate a time duration associated with the measurement window. Additionally or alternatively, the base station 105-*a* may indicate a start time for the window (e.g., a start frame) and a stop time for the window (e.g., a stope frame). In some examples, the start and stop frames may represent an interval across two I-frames. The base station 105-*a* may statically or dynamically indicate the window information to the UE 115-*a*. For example, the measurement window information may be provided via radio resource control (RRC) signaling or included with media access control (MAC) control element (CE) information.

Appropriate measurement timing window configurations may differ between QoS services. Thus, data flows (e.g., corresponding to the different QoS services) may be configured with different measurement window information. For example, a data stream for high definition video may have a different measurement timing window configuration than a data flow for real-time gaming.

In some examples, base station 105-*a* may provide an instantaneous bit rate for one or more data flows 210 based on a request from UE 115-*a*. Additionally or alternatively, base station 105-*a* may provide measurement window information for one or more data flows 210 based on a request from UE 115-*a*.

In some examples, base station 105-*a* may indicate QoS information associated with a specific data flow 210 (e.g., data flow 210-*a*, 210-*b*, or 210-*c*) to UE 115-*a* where multiple data flows 210 are associated with a single radio bearer. Base station 105-*a* may transmit data flow-specific information to UE 115-*a*. For example, base station 105-*a* may include QoS information associated with a data flow 210 in a grant for the data flow 210. In some examples, the grant may include an allocation of bits for the data flow 210. The allocation of bits may be based on bit rate configuration, for example by satisfying a GBR and an MBR of the associated radio bearer.

Figure 3:
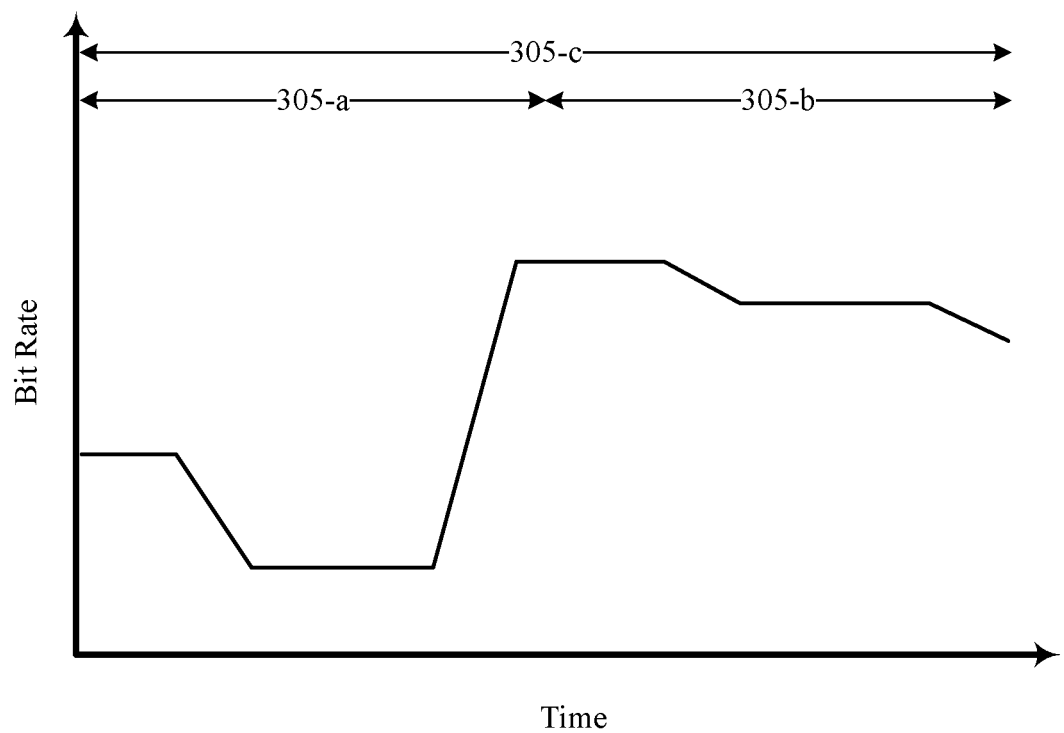
FIG. 3 illustrates an example of a measurement timing window configuration that supports QoS configurations for radio bearers with multiple data flows in accordance with aspects of the present disclosure.

FIG. 3 illustrates an example of a measurement timing window configuration 300 that supports QoS configurations for radio bearers with multiple data flows in accordance with various aspects of the present disclosure. Communication between a UE 115 and base station 105 may have a GBR (e.g., minimum bit rate) and an MBR based on a radio bearer associated with the communication. The UE 115 may measure an incoming data flow and determine whether the bit rate meets the GBR and MBR. The base station 105 may indicate a measurement timing window over which to average the bit rate to the UE 115, which may help the UE 115 determine whether the bit rate meets the GBR and MBR. A bit rate for a data stream may be based on a number of successfully received bits over a period of time. Thus, the bit rate may vary based on a measurement timing window 305 over which the UE 115 averages the bit rate.

For example, if the UE 115 measures over measurement timing window 305-*a*, the UE 115 may identify relatively low instantaneous bit rates for a majority of the timing window 305-*a*. Thus, during measurement timing window 305-*a*, the average bit rate may not meet the GBR. In contrast, the average bit rate for measurement timing window 305-*b* may be relatively high (e.g., as compared to window 305-*a*), as the instantaneous bit rate may be high for a majority of the window. Thus, the average bit rate for measurement timing window 305-*b* may meet the GBR. In some examples, the bit rate during measurement timing window 305-*b* may exceed an MBR and may still not meet QoS requirements.

The UE 115 may identify an average bit rate over measurement timing window 305-*c*. Measurement timing window 305-*c* may include or be a combination of measurement timing window 305-*a* and measurement timing window 305-*b*. In some examples, the average bit rate over measurement timing window 305-*c* may meet the GBR but not exceed the MBR. In any case, the average bit rate may be affected by which measurement timing window 305 is chosen.

In some examples, the base station 105 may statically or dynamically indicate measurement timing information to the UE 115. For example, the base station 105 may explicitly indicate to the UE 115 to measure over measurement timing window 305-*c*. Additionally or alternatively, the UE 115 may implicitly determine to average over measurement timing window 305-*c* based on a frame type received during measurement timing window 305-*c* (e.g., for a first and last frame of the window). In some examples, the measurement timing information may be provided by RRC signaling or included with MAC CE information.

In some examples, measurement timing window configurations may differ between QoS services. Thus, data flows (e.g., corresponding to the different QoS services) may be configured with different measurement window configurations. For example, a base station 105 may indicate to use measurement timing window 305-*a* for a first data flow and measurement timing window 305-*c* for a second data flow.

Figure 4:
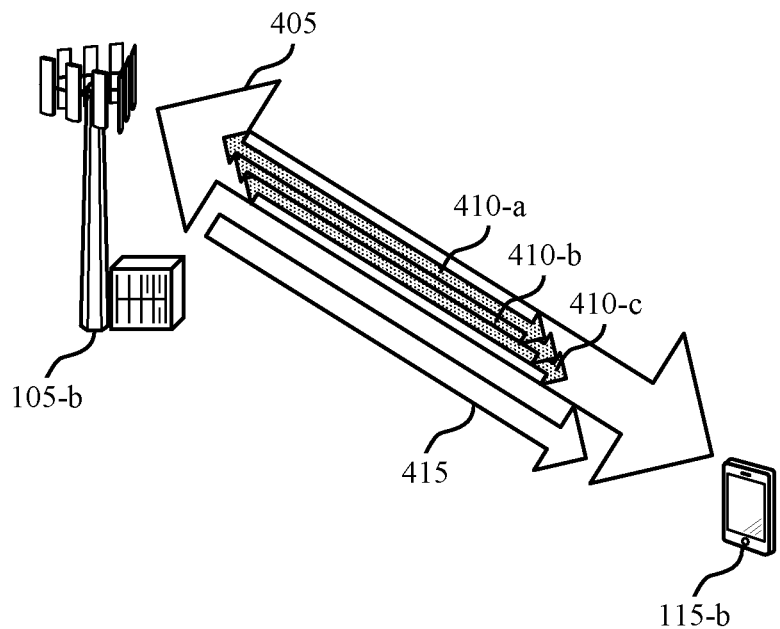
FIG. 4 illustrates an example of a QoS configuration indication that supports QoS configurations for radio bearers with multiple data flows in accordance with aspects of the present disclosure.

FIG. 4 illustrates an example of a QoS configuration indication 400 that supports QoS configurations for radio bearers with multiple data flows in accordance with various aspects of the present disclosure. QoS configuration indication 400 may include UE 115-*b* and base station 105-*b*, which may be respective examples of a UE 115 and base station 105 as described herein. UE 115-*b* and base station 105-*b* may establish a communication link 405 for uplink and downlink transmissions. The communication link 405 may be configured with one or more radio bearers. In some examples, a radio bearer may include one or more data flows 410 (e.g., data flow 410-*a*, 410-*b*, and 410-*c*). A data flow 410 may be an example of a QoS flow. That is, multiple QoS flows may be mapped to a single radio bearer. In some examples, each data flow 410 may be associated with a different QoS configuration or parameter. Base station 105-*b* may transmit a grant 415 for one or more of the data flows 410. In some examples, base station 105-*b* may indicate information regarding one or more data flows 410 to UE 115-*b* in the grant 415.

For example, the grant 415 may indicate QoS requirements for one or more of the data flows 410. For example, the grant 415 may include a GBR or MBR for a data flow 410. Additionally or alternatively, the grant 415 may include QoS parameters such as a QoS class identifier (QCI) for a data flow 410. The grant 415 may be an example of a downlink grant or an uplink grant. In yet other examples, the grant 415 may include some other type of control signaling.

In some examples, the grant may indicate an allocation of bits between one or more data flows 410. The allocation of bits may be based on bit rate configuration, for example by satisfying a GBR and an MBR of the associated radio bearer. In some cases, an allocation of bits from base station 105-*b* may first consider GBR radio bearers, then consider non-GBR radio bearers. For example, if the grant 415 allocates 3000 bits, the grant 415 may indicate, for example, an allocation of 2000 bits for a GBR radio bearer and 1000 bits for a non-GBR radio bearer.

Figure 5:
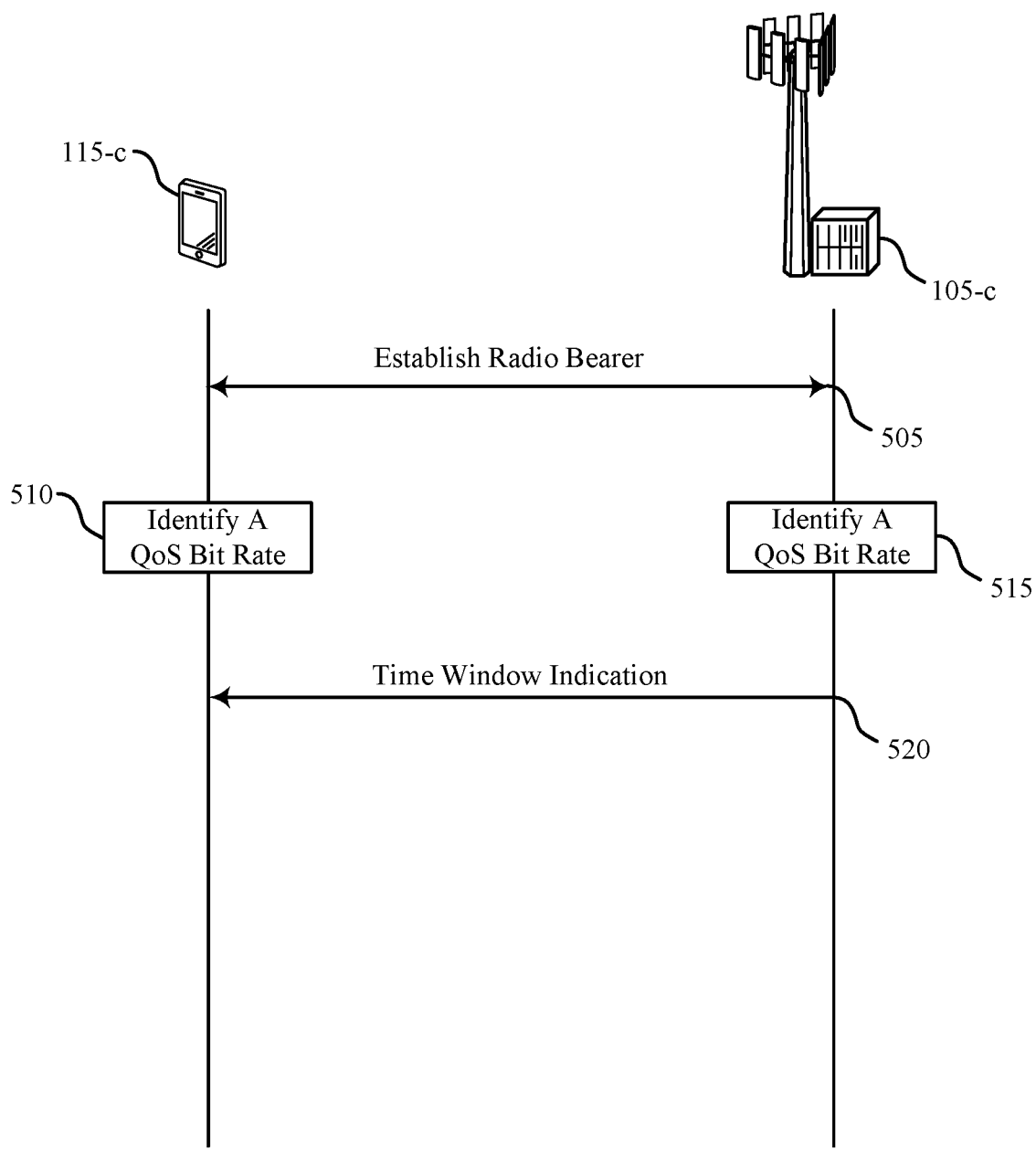
FIGS. 5 and 6 illustrate examples of process flows that support QoS configurations for radio bearers with multiple data flows in accordance with aspects of the present disclosure.

FIG. 5 illustrates an example of a process flow 500 that supports QoS configurations for radio bearers with multiple data flows in accordance with various aspects of the present disclosure. Process flow 500 may include UE 115-*c* and base station 105-*c*, which may be respective examples of a UE 115 and base station 105 as described herein.

At 505, UE 115-*c* and base station 105-*c* may establish a radio bearer. In some examples, UE 115-*c* may identify multiple configured data flows associated with the radio bearer.

At 510, UE 115-*c* may identify a QoS bit rate associated with the radio bearer. In some examples, UE 115-*c* may identify a different QoS bit rate associated with each configured data flow of the multiple data flows. In some examples, at 515, the base station 105-*c* may identify a QoS bit rate associated with the radio bearer, and may identify a different QoS bit rate associated with each configured data flow of the multiple data flows. The UE 115-*c* and the base station 105-*c* may each make this identification separately or may make the identification jointly. In some examples, only one of the UE 115-*c* or base station 105-*c* may make this identification.

At 520, UE 115-*c* may receive an indication of a time window over which the QoS bit rate is averaged. In some examples, receiving the indication includes receiving a duration of the time window. Additionally or alternatively, receiving the indication includes receiving a start frame of the time window and a stop frame of the time window. In some examples, the indication may be received via RRC signaling. In some examples, the indication may be received via a MAC CE. In some cases, the indication may include a different time window over which each different QoS bit rate associated with each configured data flow is averaged. In some instances, the indication may be received in response to the request for an indication of the instantaneous bit rate.

In some examples, UE 115-*c* may transmit a request for an indication of the time window associated with at least one of the multiple configured data flows, and UE 115-*c* may receive the indication of the time window in response to the request. In some cases, UE 115-*c* may schedule and predict data traffic associated with the radio bearer based on the QoS bit rate and the time window.

Figure 6:
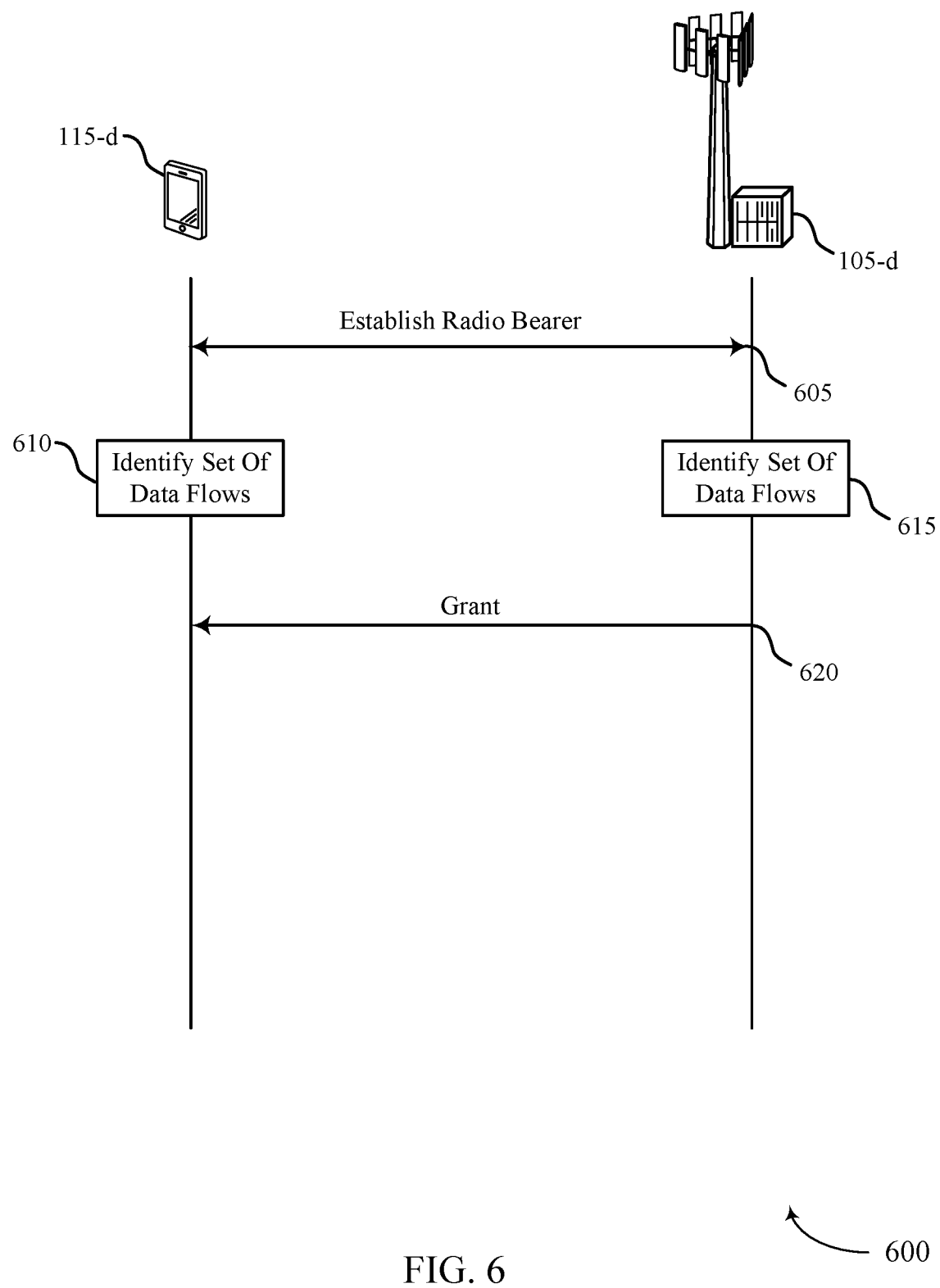

FIG. 6 illustrates an example of a process flow 600 that supports QoS configurations for radio bearers with multiple data flows in accordance with various aspects of the present disclosure. Process flow 600 may include UE 115-*d* and base station 105-*d*, which may be respective examples of a UE 115 and a base station 105. In some examples, base station 105-*d* may indicate QoS information to UE 115-*d* in a grant.

At 605, UE 115-*d* and base station 105-*d* may establish a radio bearer. At 610, UE 115-*d* may identify a set of configured data flows associated with the radio bearer. In some examples, at 615, the base station 105-*d* may identify a set of configured data flows associated with the radio bearer, and may identify a different QoS bit rate associated with each configured data flow of the multiple data flows. The UE 115-*d* and the base station 105-*d* may each make this identification separately or may make the identification jointly. In some examples, only one of the UE 115-*d* or base station 105-*d* may make this identification.

At 620, base station 105-*d* may transmit a grant to UE 115-*d*. In some examples, the grant may include a QoS parameter for each configured data flow of the set of configured data flows. In some cases, transmitting the grant may include transmitting an allocation of bits for a first configured data flow of the set of configured data flows and an allocation of bits for a second configured data flow of the set of configure data flows. In some instances, the allocation of bits for the first configured data flow may be configured to satisfy a first QoS priority level, and the allocation of the bits for the second configured data flow may be configured to satisfy a second QoS priority level that is lower than the first QoS priority level. In some aspects, the first QoS priority level may be a GBR, and the second QoS priority level may be a non-GBR.

Figure 7:
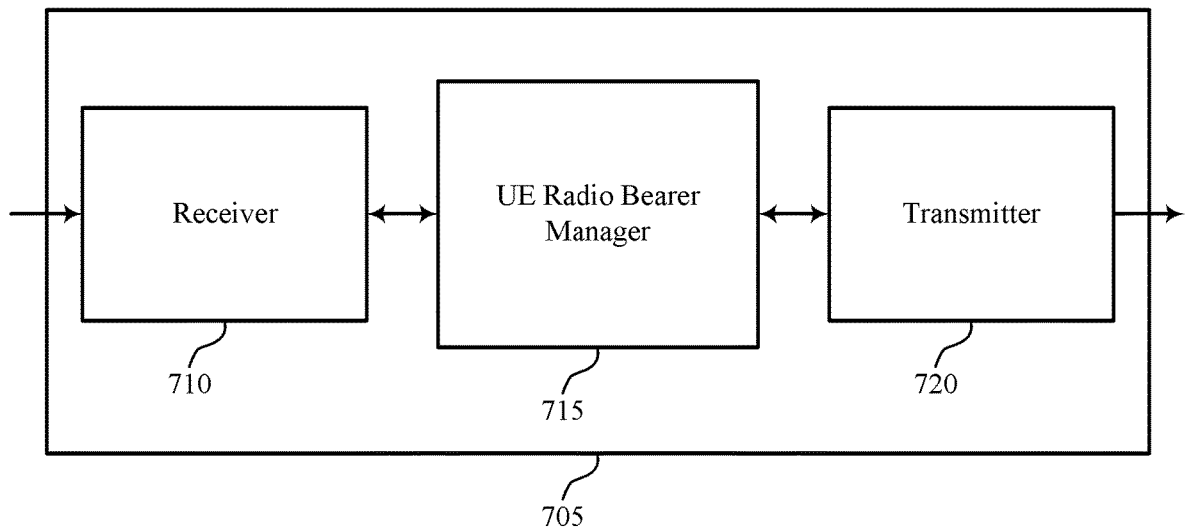
FIGS. 7 through 9 show block diagrams of a device that supports QoS configurations for radio bearers with multiple data flows in accordance with aspects of the present disclosure.

FIG. 7 shows a block diagram 700 of a wireless device 705 that supports QoS configurations for radio bearers with multiple data flows in accordance with aspects of the present disclosure. Wireless device 705 may be an example of aspects of a UE 115 as described with reference to FIG. 1. Wireless device 705 may include receiver 710, UE radio bearer manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to QoS configurations for radio bearers with multiple data flows). Information may be passed on to other components of the device. The receiver 710 may be an example of aspects of the transceiver 1035 described with reference to FIG. 10. The receiver 710 may utilize a single antenna or a set of antennas.

Receiver 710 may receive the indication of the instantaneous bit rate in response to the request and receive the indication of the time window in response to the request.

UE radio bearer manager 715 may be an example of aspects of the UE radio bearer manager 1015 described with reference to FIG. 10.

UE radio bearer manager 715 and/or at least some of its various sub-components may be implemented in hardware, software executed by a processor, firmware, or any combination thereof. If implemented in software executed by a processor, the functions of the UE radio bearer manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE radio bearer manager 715 and/or at least some of its various sub-components may be physically located at various positions, including being distributed such that portions of functions are implemented at different physical locations by one or more physical devices. In some examples, UE radio bearer manager 715 and/or at least some of its various sub-components may be a separate and distinct component in accordance with various aspects of the present disclosure. In other examples, UE radio bearer manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE radio bearer manager 715 may establish a radio bearer with a network entity, identify a QoS bit rate associated with the radio bearer, and receive an indication of a time window over which the QoS bit rate is averaged. The UE radio bearer manager 715 may also establish a radio bearer with a network entity (e.g., a base station), identify a set of configured data flows associated with the radio bearer, and receive a grant from the network entity including a QoS parameter for each configured data flow of the set of configured data flows.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Transmitter 720 may transmit a request for an indication of an instantaneous bit rate associated with at least one of the set of configured data flows and transmit a request for an indication of the time window associated with at least one of the set of configured data flows.

Figure 8:
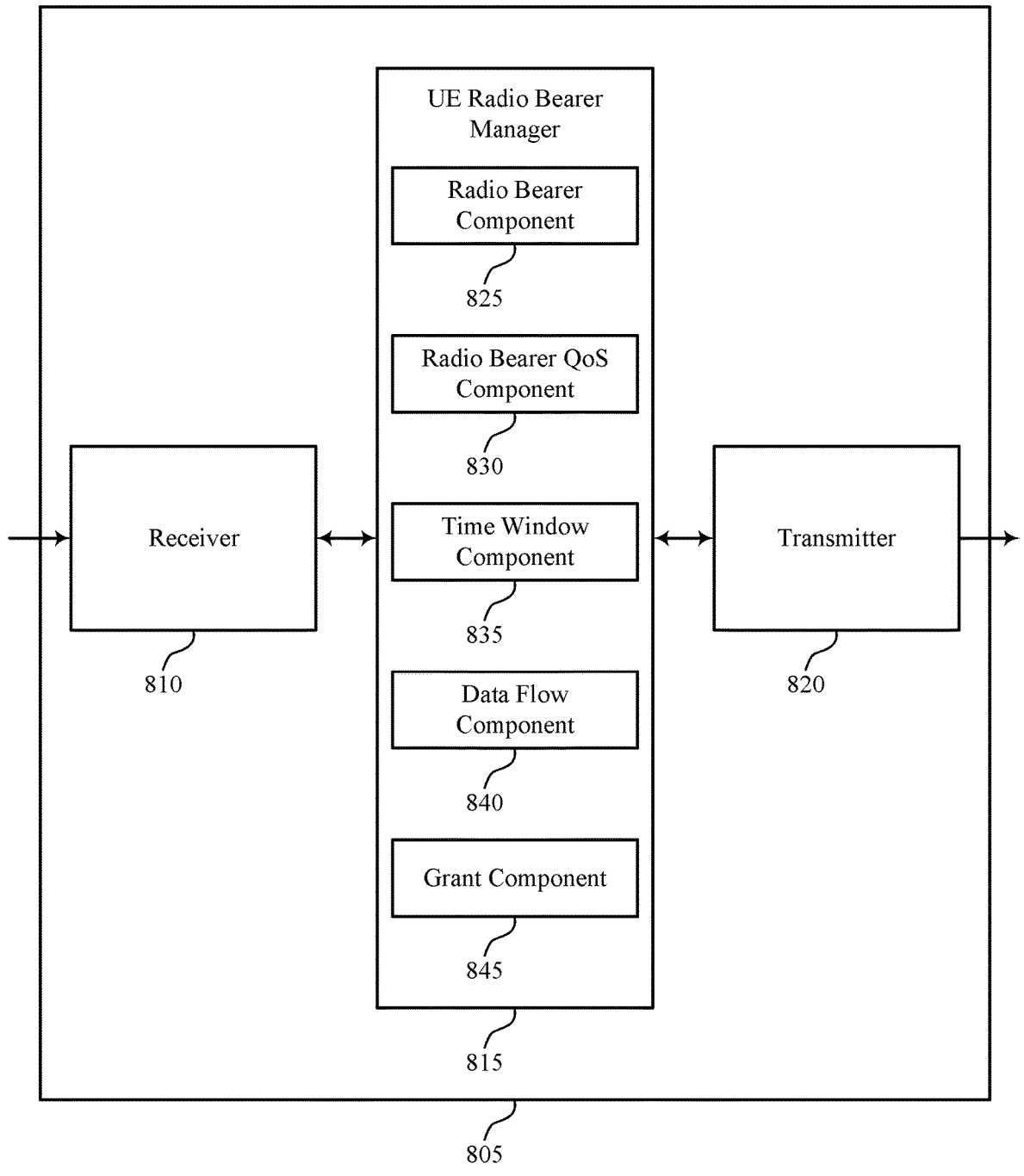

FIG. 8 shows a block diagram 800 of a wireless device 805 that supports QoS configurations for radio bearers with multiple data flows in accordance with aspects of the present disclosure. Wireless device 805 may be an example of aspects of a wireless device 705 or a UE 115 as described with reference to FIGS. 1 and 7. Wireless device 805 may include receiver 810, UE radio bearer manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to QoS configurations for radio bearers with multiple data flows). Information may be passed on to other components of the device. The receiver 810 may be an example of aspects of the transceiver 1035 described with reference to FIG. 10. The receiver 810 may utilize a single antenna or a set of antennas.

UE radio bearer manager 815 may be an example of aspects of the UE radio bearer manager 1015 described with reference to FIG. 10. UE radio bearer manager 815 may also include radio bearer component 825, radio bearer QoS component 830, time window component 835, data flow component 840, and grant component 845. Radio bearer component 825 may establish a radio bearer with a network entity. Radio bearer QoS component 830 may identify a QoS bit rate associated with the radio bearer.

Time window component 835 may receive an indication of a time window over which the QoS bit rate is averaged. In some cases, receiving the indication includes receiving a duration of the time window. In some examples, receiving the indication includes receiving a start frame of the time window and a stop frame of the time window. In some instances, receiving the indication includes receiving the indication via RRC signaling. In some aspects, receiving the indication includes receiving the indication via a MAC CE.

Data flow component 840 may identify a set of configured data flows associated with the radio bearer.

Grant component 845 may receive a grant from the network entity including a QoS parameter for each configured data flow of the set of configured data flows. In some cases, receiving the grant includes receiving an allocation of bits for a first configured data flow of the set of configured data flows and an allocation of bits for a second configured data flow of the set of configured data flows. In some examples, the allocation of bits for the first configured data flow is configured to satisfy a first QoS priority level, and where the allocation of bits for the second configured data flow is configured to satisfy a second QoS priority level that is lower than the first QoS priority level. In some instances, the first QoS priority level includes a GBR and the second QoS priority level includes a non-GBR.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
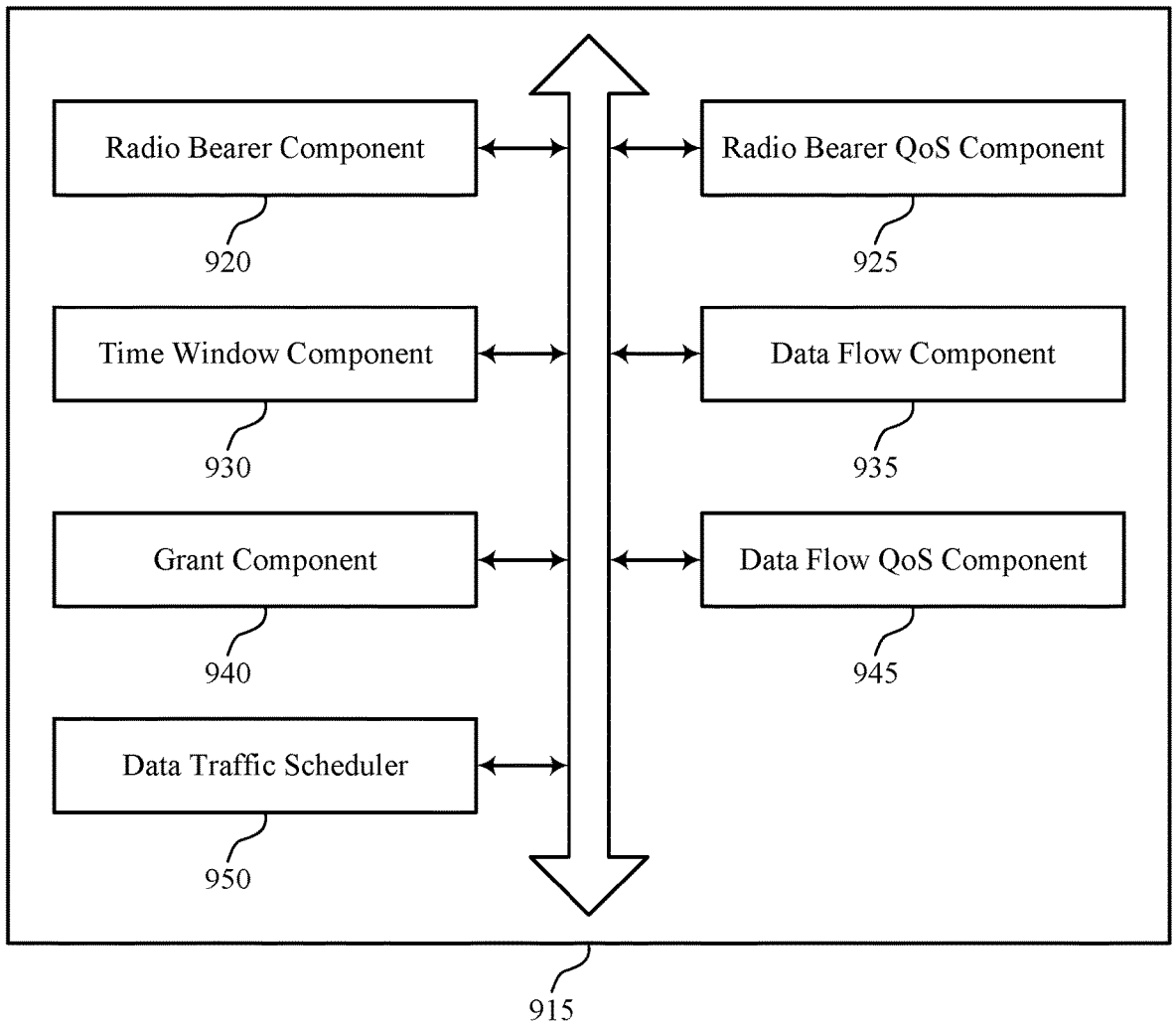

FIG. 9 shows a block diagram 900 of a UE radio bearer manager 915 that supports QoS configurations for radio bearers with multiple data flows in accordance with aspects of the present disclosure. The UE radio bearer manager 915 may be an example of aspects of a UE radio bearer manager 715, a UE radio bearer manager 815, or a UE radio bearer manager 1015 described with reference to FIGS. 7, 8, and 10. The UE radio bearer manager 915 may include radio bearer component 920, radio bearer QoS component 925, time window component 930, data flow component 935, grant component 940, data flow QoS component 945, and data traffic scheduler 950. Each of these modules may communicate, directly or indirectly, with one another (e.g., via one or more buses).

Radio bearer component 920 may establish a radio bearer with a network entity. Radio bearer QoS component 925 may identify a QoS bit rate associated with the radio bearer.

Time window component 930 may receive an indication of a time window over which the QoS bit rate is averaged. In some examples, receiving the indication includes receiving a duration of the time window. In some cases, receiving the indication includes receiving a start frame of the time window and a stop frame of the time window. In some instances, receiving the indication includes receiving the indication via RRC signaling. In some aspects, receiving the indication includes receiving the indication via a MAC CE.

Data flow component 935 may identify a set of configured data flows associated with the radio bearer.

Grant component 940 may receive a grant from the network entity including a QoS parameter for each configured data flow of the set of configured data flows. In some examples, receiving the grant includes receiving an allocation of bits for a first configured data flow of the set of configured data flows and an allocation of bits for a second configured data flow of the set of configured data flows. In some cases, the allocation of bits for the first configured data flow is configured to satisfy a first QoS priority level, and where the allocation of bits for the second configured data flow is configured to satisfy a second QoS priority level that is lower than the first QoS priority level. In some instances, the first QoS priority level includes a GBR and the second QoS priority level includes a non-GBR.

Data flow QoS component 945 may identify a different QoS bit rate associated with each configured data flow of the set of configured data flows, where the indication includes a different time window over which each different QoS bit rate is averaged.

Data traffic scheduler 950 may schedule and predicting data traffic associated with the radio bearer based on the QoS bit rate and the time window.

Figure 10:
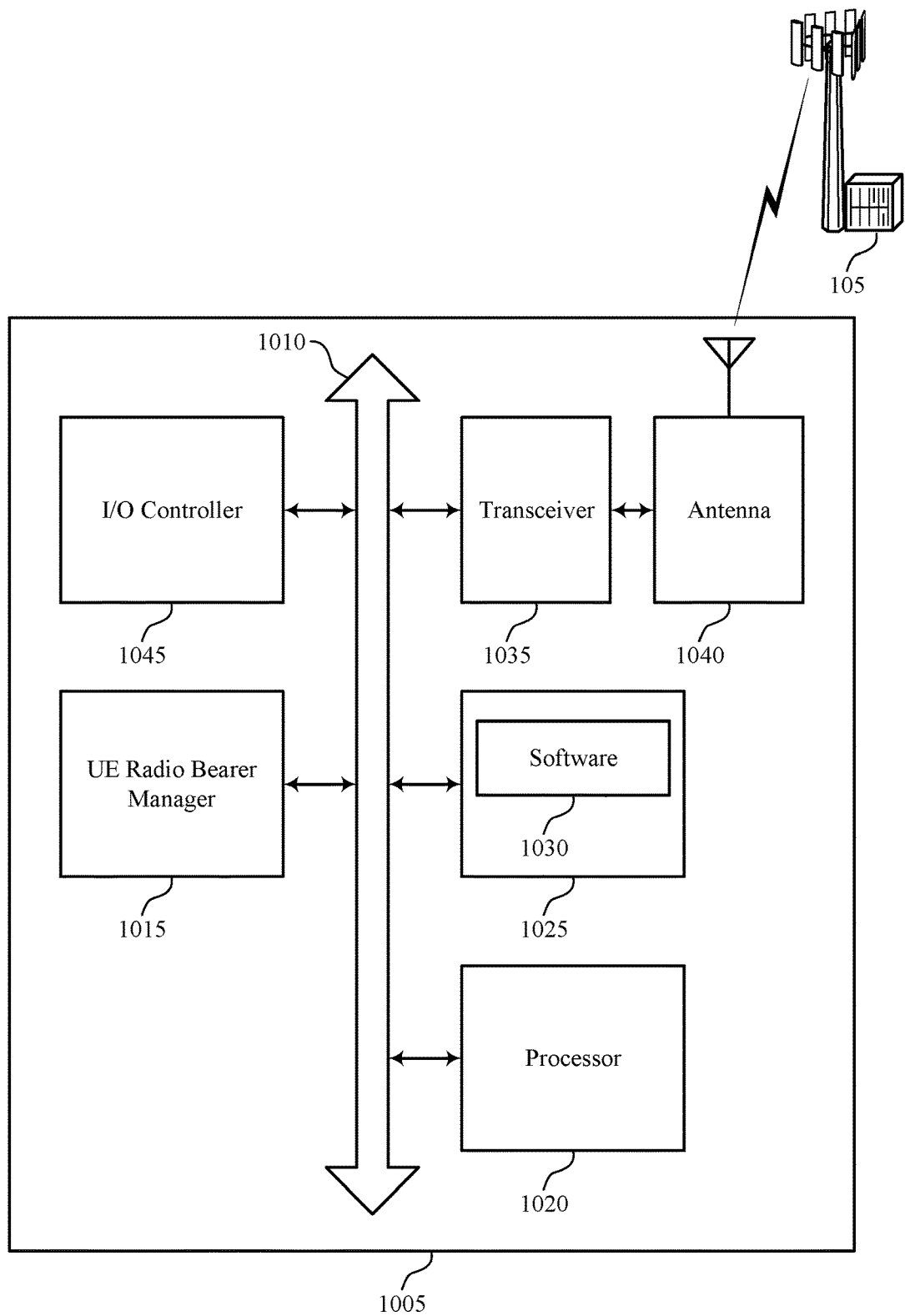
FIG. 10 illustrates a block diagram of a system including a user equipment (UE) that supports QoS configurations for radio bearers with multiple data flows in accordance with aspects of the present disclosure.

FIG. 10 shows a diagram of a system 1000 including a device 1005 that supports QoS configurations for radio bearers with multiple data flows in accordance with aspects of the present disclosure. Device 1005 may be an example of or include the components of wireless device 705, wireless device 805, or a UE 115 as described above, e.g., with reference to FIGS. 1, 7 and 8. Device 1005 may include components for bi-directional voice and data communications including components for transmitting and receiving communications, including UE radio bearer manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting QoS configurations for radio bearers with multiple data flows).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support QoS configurations for radio bearers with multiple data flows. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
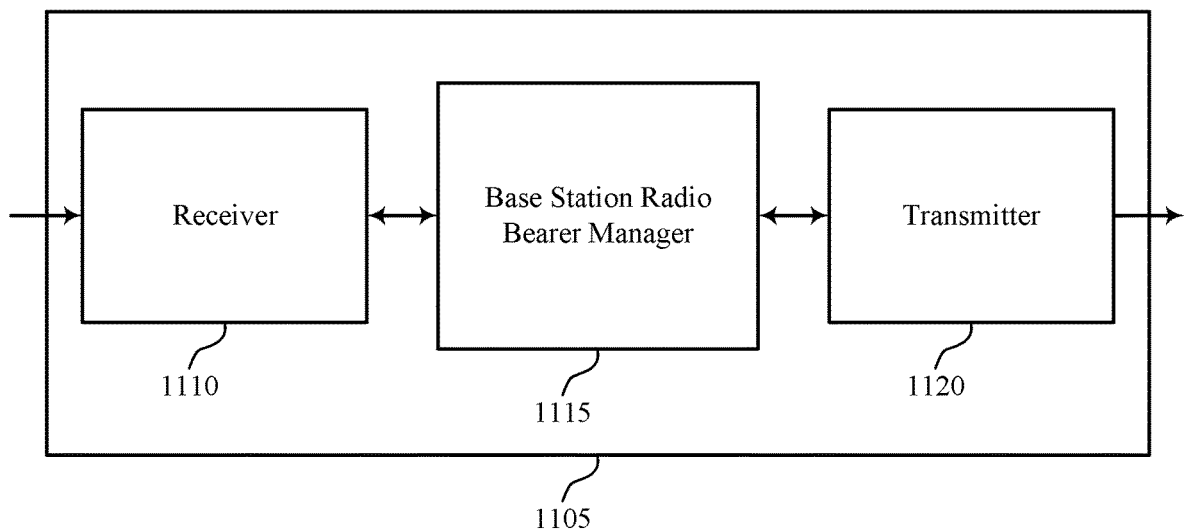
FIGS. 11 through 13 show block diagrams of a device that supports QoS configurations for radio bearers with multiple data flows in accordance with aspects of the present disclosure.

FIG. 11 shows a block diagram 1100 of a wireless device 1105 that supports QoS configurations for radio bearers with multiple data flows in accordance with aspects of the present disclosure. Wireless device 1105 may be an example of aspects of a base station 105 as described with reference to FIG. 1. Wireless device 1105 may include receiver 1110, base station radio bearer manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to QoS configurations for radio bearers with multiple data flows). Information may be passed on to other components of the device. The receiver 1110 may be an example of aspects of the transceiver 1435 described with reference to FIG. 14. The receiver 1110 may utilize a single antenna or a set of antennas.

Receiver 1110 may receive a request for an indication of an instantaneous bit rate associated with at least one of the set of configured data flows and receive a request for an indication of the time window associated with at least one of the set of configured data flows.

Base station radio bearer manager 1115 may be an example of aspects of the base station radio bearer manager 1415 described with reference to FIG. 14.

Base station radio bearer manager 1115 and/or at least some of its various sub-components may be implemented in hardware, software executed by a processor, firmware, or any combination thereof. If implemented in software executed by a processor, the functions of the base station radio bearer manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station radio bearer manager 1115 and/or at least some of its various sub-components may be physically located at various positions, including being distributed such that portions of functions are implemented at different physical locations by one or more physical devices. In some examples, base station radio bearer manager 1115 and/or at least some of its various sub-components may be a separate and distinct component in accordance with various aspects of the present disclosure. In other examples, base station radio bearer manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station radio bearer manager 1115 may establish a radio bearer with a UE 115, identify a QoS bit rate associated with the radio bearer, and transmit an indication of a time window over which the QoS bit rate is averaged. The base station radio bearer manager 1115 may also establish a radio bearer with a UE 115, identify a set of configured data flows associated with the radio bearer, and transmit a grant to the UE 115 including a QoS parameter for each configured data flow of the set of configured data flows.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Transmitter 1120 may transmit the indication of the instantaneous bit rate in response to the request and transmit the indication of the time window in response to the request.

Figure 12:
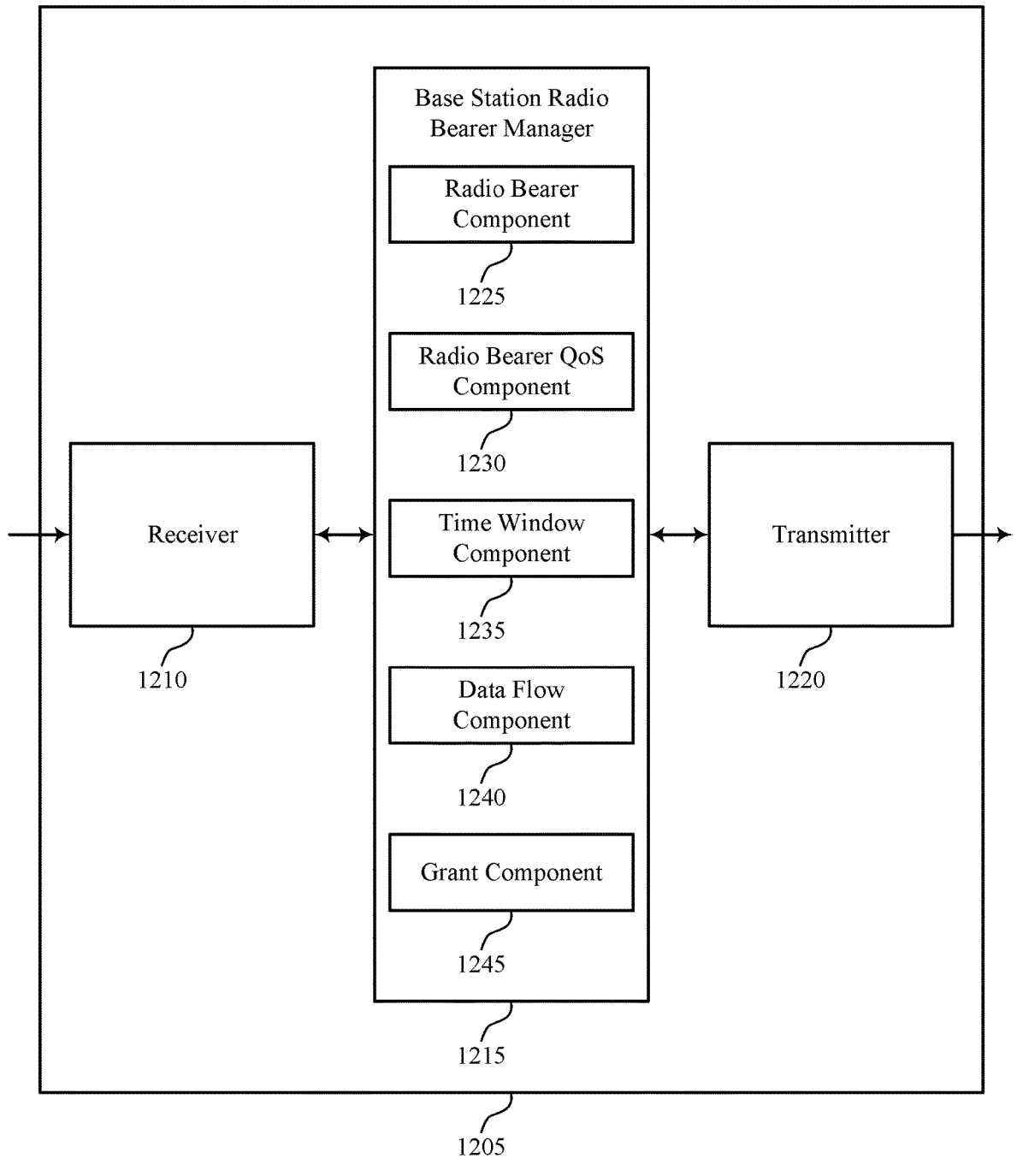

FIG. 12 shows a block diagram 1200 of a wireless device 1205 that supports QoS configurations for radio bearers with multiple data flows in accordance with aspects of the present disclosure. Wireless device 1205 may be an example of aspects of a wireless device 1105 or a base station 105 as described with reference to FIGS. 1 and 11. Wireless device 1205 may include receiver 1210, base station radio bearer manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to QoS configurations for radio bearers with multiple data flows). Information may be passed on to other components of the device. The receiver 1210 may be an example of aspects of the transceiver 1435 described with reference to FIG. 14. The receiver 1210 may utilize a single antenna or a set of antennas.

Base station radio bearer manager 1215 may be an example of aspects of the base station radio bearer manager 1415 described with reference to FIG. 14. Base station radio bearer manager 1215 may also include radio bearer component 1225, radio bearer QoS component 1230, time window component 1235, data flow component 1240, and grant component 1245. Radio bearer component 1225 may establish a radio bearer with a UE 115. Radio bearer QoS component 1230 may identify a QoS bit rate associated with the radio bearer.

Time window component 1235 may transmit an indication of a time window over which the QoS bit rate is averaged. In some cases, transmitting the indication includes transmitting a duration of the time window. In some examples, transmitting the indication includes transmitting a start frame of the time window and a stop frame of the time window. In some instances, transmitting the indication includes transmitting the indication via RRC signaling. In some aspects, transmitting the indication includes transmitting the indication via a MAC CE. Data flow component 1240 may identify a set of configured data flows associated with the radio bearer.

Grant component 1245 may transmit a grant to the UE 115 including a QoS parameter for each configured data flow of the set of configured data flows. In some examples, transmitting the grant includes transmitting an allocation of bits for a first configured data flow of the set of configured data flows and an allocation of bits for a second configured data flow of the set of configured data flows. In some cases, the allocation of bits for the first configured data flow is configured to satisfy a first QoS priority level, and where the allocation of bits for the second configured data flow is configured to satisfy a second QoS priority level that is lower than the first QoS priority level. In some instances, the first QoS priority level includes a GBR and the second QoS priority level includes a non-GBR.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
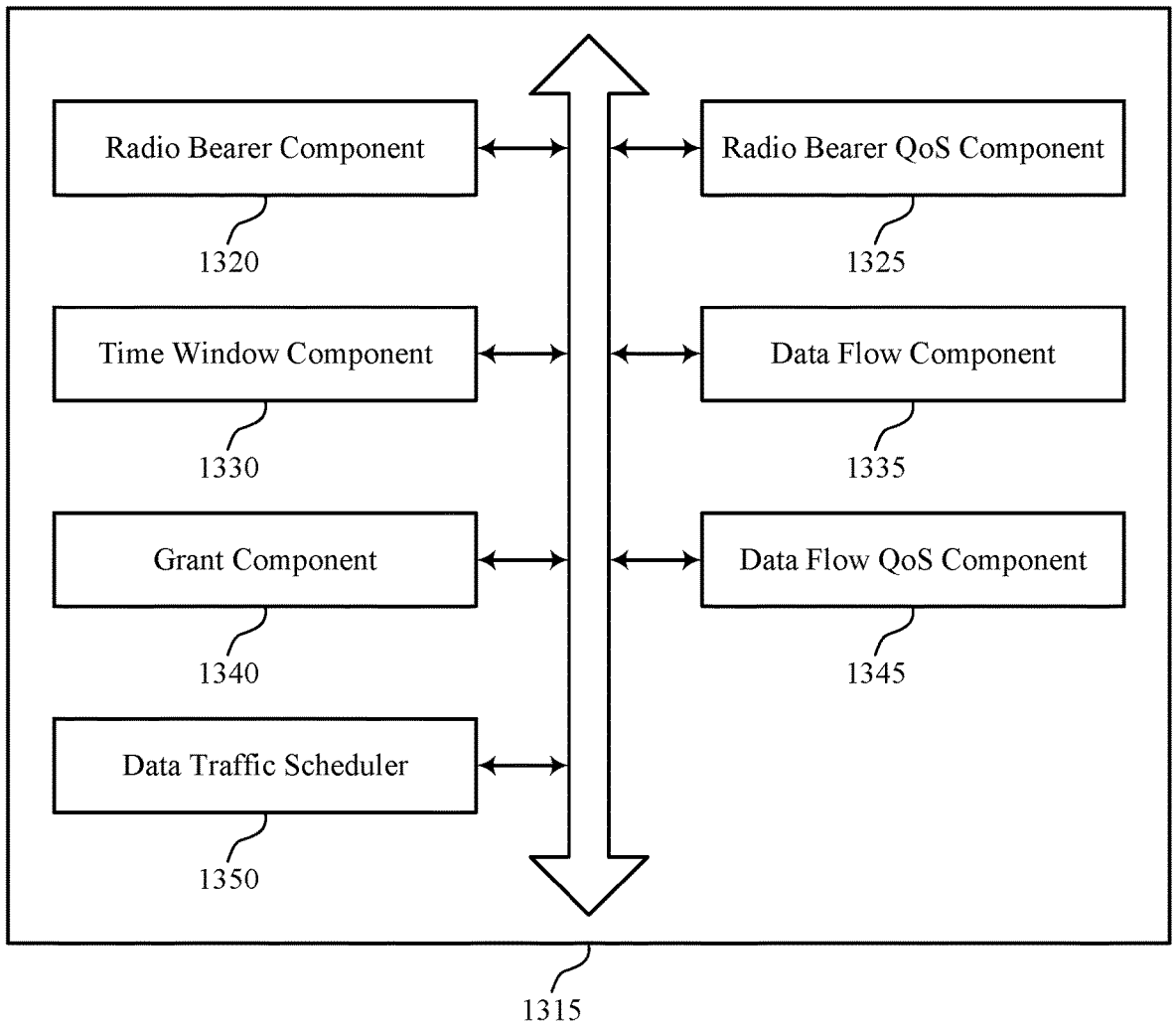

FIG. 13 shows a block diagram 1300 of a base station radio bearer manager 1315 that supports QoS configurations for radio bearers with multiple data flows in accordance with aspects of the present disclosure. The base station radio bearer manager 1315 may be an example of aspects of a base station radio bearer manager 1415 described with reference to FIGS. 11, 12, and 14. The base station radio bearer manager 1315 may include radio bearer component 1320, radio bearer QoS component 1325, time window component 1330, data flow component 1335, grant component 1340, data flow QoS component 1345, and data traffic scheduler 1350. Each of these modules may communicate, directly or indirectly, with one another (e.g., via one or more buses). Radio bearer component 1320 may establish a radio bearer with a UE 115. Radio bearer QoS component 1325 may identify a QoS bit rate associated with the radio bearer.

Time window component 1330 may transmit an indication of a time window over which the QoS bit rate is averaged. In some examples, transmitting the indication includes transmitting a duration of the time window. In some cases, transmitting the indication includes transmitting a start frame of the time window and a stop frame of the time window. In some instances, transmitting the indication includes transmitting the indication via RRC signaling. In some aspects, transmitting the indication includes transmitting the indication via a MAC CE. Data flow component 1335 may identify a set of configured data flows associated with the radio bearer.

Grant component 1340 may transmit a grant to the UE 115 including a QoS parameter for each configured data flow of the set of configured data flows. In some examples, transmitting the grant includes transmitting an allocation of bits for a first configured data flow of the set of configured data flows and an allocation of bits for a second configured data flow of the set of configured data flows. In some cases, the allocation of bits for the first configured data flow is configured to satisfy a first QoS priority level, and where the allocation of bits for the second configured data flow is configured to satisfy a second QoS priority level that is lower than the first QoS priority level. In some instances, the first QoS priority level includes a GBR and the second QoS priority level includes a non-GBR.

Data flow QoS component 1345 may identify a different QoS bit rate associated with each configured data flow of the set of configured data flows, where the indication includes a different time window over which each different QoS bit rate is averaged. Data traffic scheduler 1350 may schedule and predicting data traffic associated with the radio bearer based on the QoS bit rate and the time window.

Figure 14:
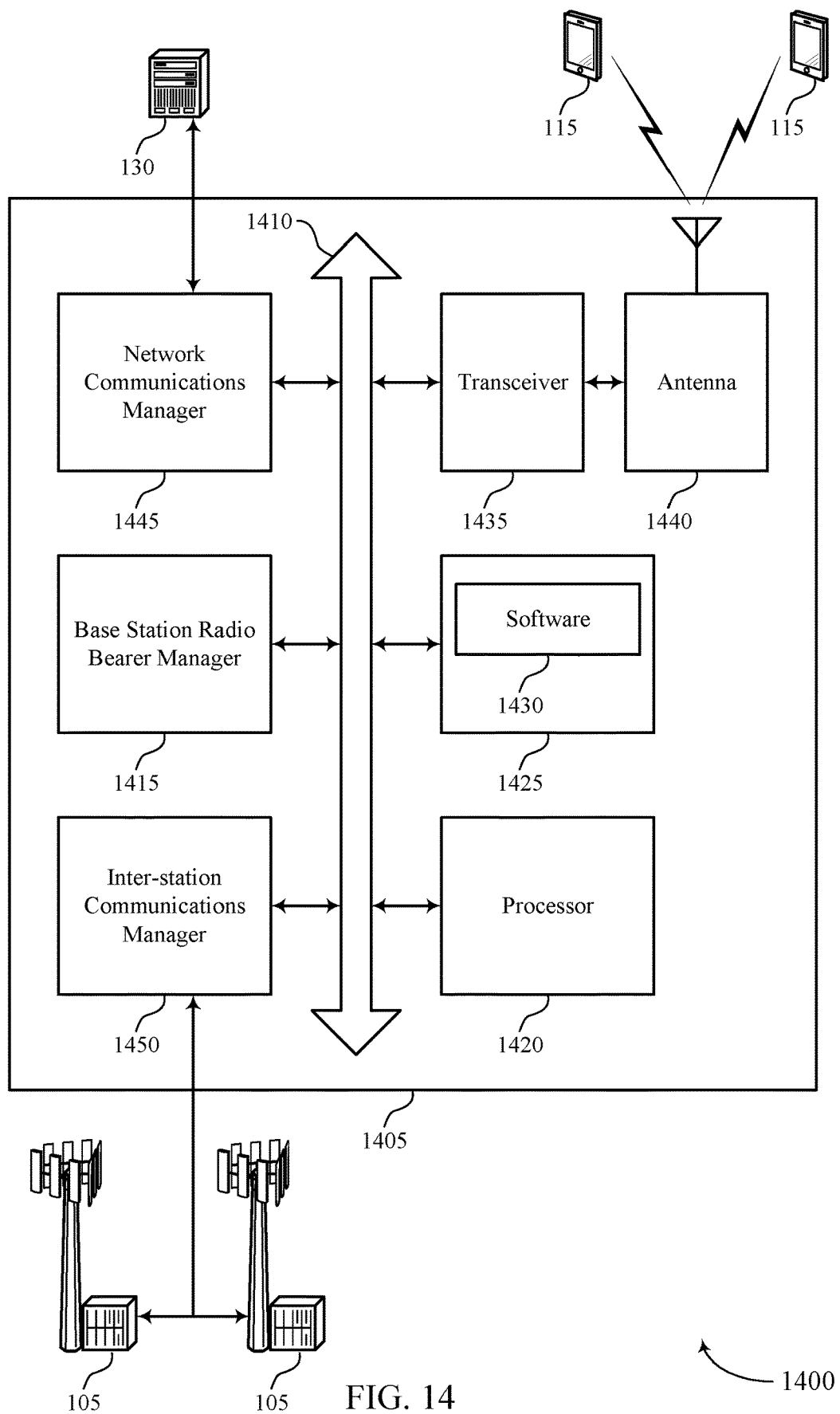
FIG. 14 illustrates a block diagram of a system including a base station that supports QoS configurations for radio bearers with multiple data flows in accordance with aspects of the present disclosure.

FIG. 14 shows a diagram of a system 1400 including a device 1405 that supports QoS configurations for radio bearers with multiple data flows in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station radio bearer manager 1415, processor 1420, memory 1425, software 1430, transceiver 1435, antenna 1440, network communications manager 1445, and inter-station communications manager 1450. These components may be in electronic communication via one or more busses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting QoS configurations for radio bearers with multiple data flows).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support QoS configurations for radio bearers with multiple data flows. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
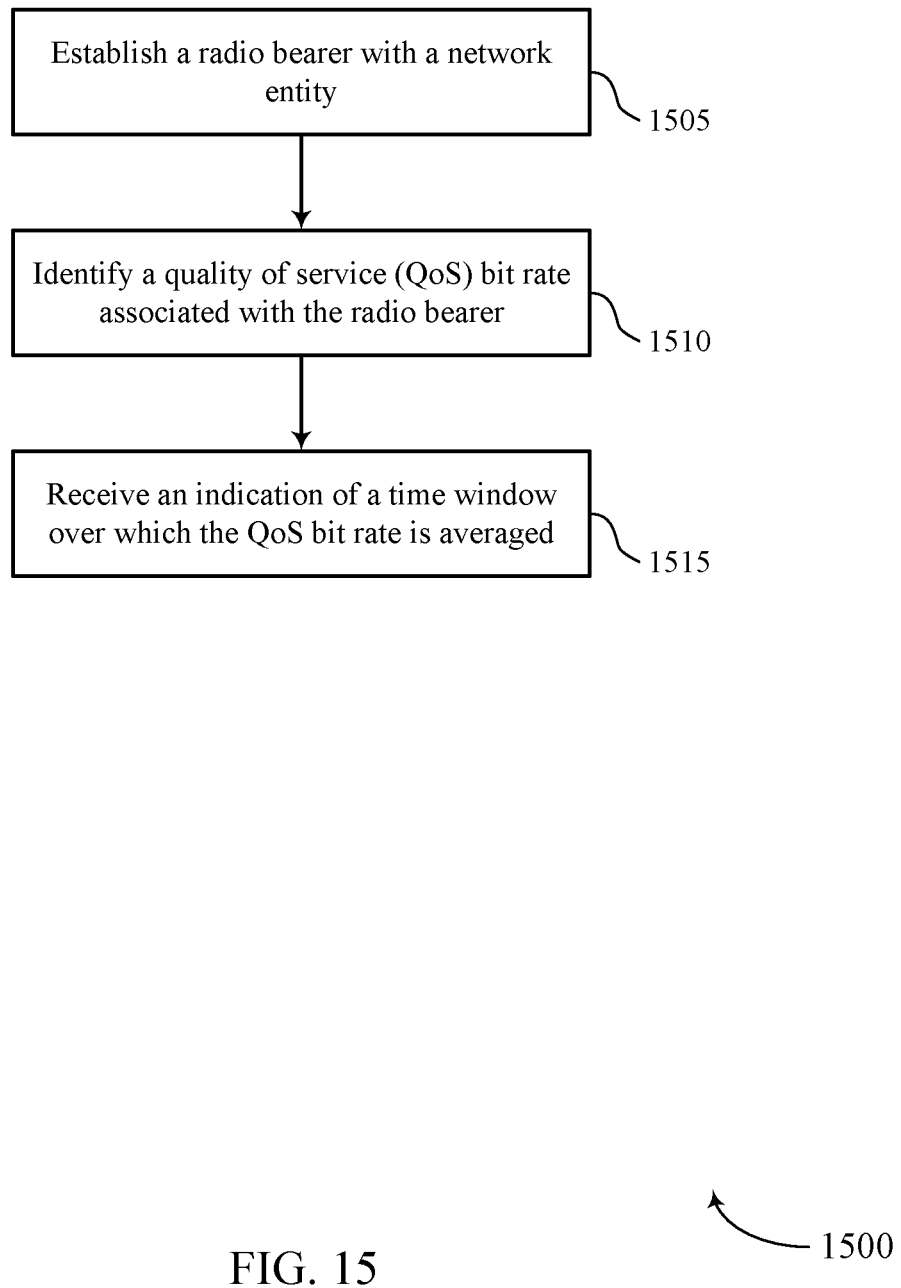
FIGS. 15 through 18 illustrate methods for QoS configurations for radio bearers with multiple data flows in accordance with aspects of the present disclosure.

FIG. 15 shows a flowchart illustrating a method 1500 for QoS configurations for radio bearers with multiple data flows in accordance with aspects of the present disclosure. The operations of method 1500 may be implemented by a UE 115 or its components as described herein. For example, the operations of method 1500 may be performed by a UE radio bearer manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may establish a radio bearer with a network entity. The operations of block 1505 may be performed according to the methods described with reference to FIGS. 1 through 6. In certain examples, aspects of the operations of block 1505 may be performed by a radio bearer component as described with reference to FIGS. 7 through 10.

At block 1510 the UE 115 may identify a QoS bit rate associated with the radio bearer. The operations of block 1510 may be performed according to the methods described with reference to FIGS. 1 through 6. In certain examples, aspects of the operations of block 1510 may be performed by a radio bearer QoS component as described with reference to FIGS. 7 through 10.

At block 1515 the UE 115 may receive an indication of a time window over which the QoS bit rate is averaged. The operations of block 1515 may be performed according to the methods described with reference to FIGS. 1 through 6. In certain examples, aspects of the operations of block 1515 may be performed by a time window component as described with reference to FIGS. 7 through 10.

Figure 16:
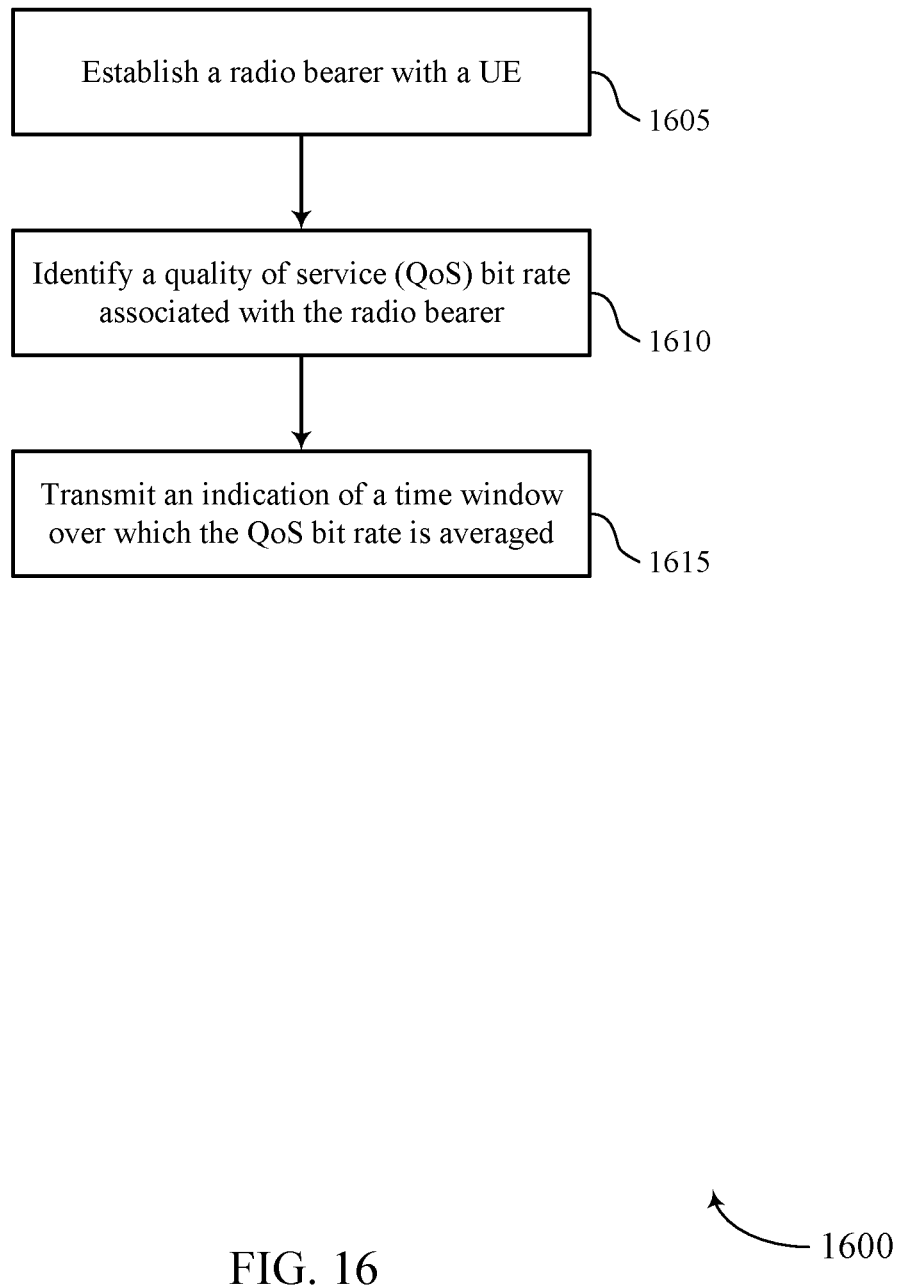

FIG. 16 shows a flowchart illustrating a method 1600 for QoS configurations for radio bearers with multiple data flows in accordance with aspects of the present disclosure. The operations of method 1600 may be implemented by a base station 105 or its components as described herein. For example, the operations of method 1600 may be performed by a base station radio bearer manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may establish a radio bearer with a UE 115. The operations of block 1605 may be performed according to the methods described with reference to FIGS. 1 through 6. In certain examples, aspects of the operations of block 1605 may be performed by a radio bearer component as described with reference to FIGS. 11 through 14.

At block 1610 the base station 105 may identify a QoS bit rate associated with the radio bearer. The operations of block 1610 may be performed according to the methods described with reference to FIGS. 1 through 6. In certain examples, aspects of the operations of block 1610 may be performed by a radio bearer QoS component as described with reference to FIGS. 11 through 14.

At block 1615 the base station 105 may transmit an indication of a time window over which the QoS bit rate is averaged. The operations of block 1615 may be performed according to the methods described with reference to FIGS. 1 through 6. In certain examples, aspects of the operations of block 1615 may be performed by a time window component as described with reference to FIGS. 11 through 14.

Figure 17:
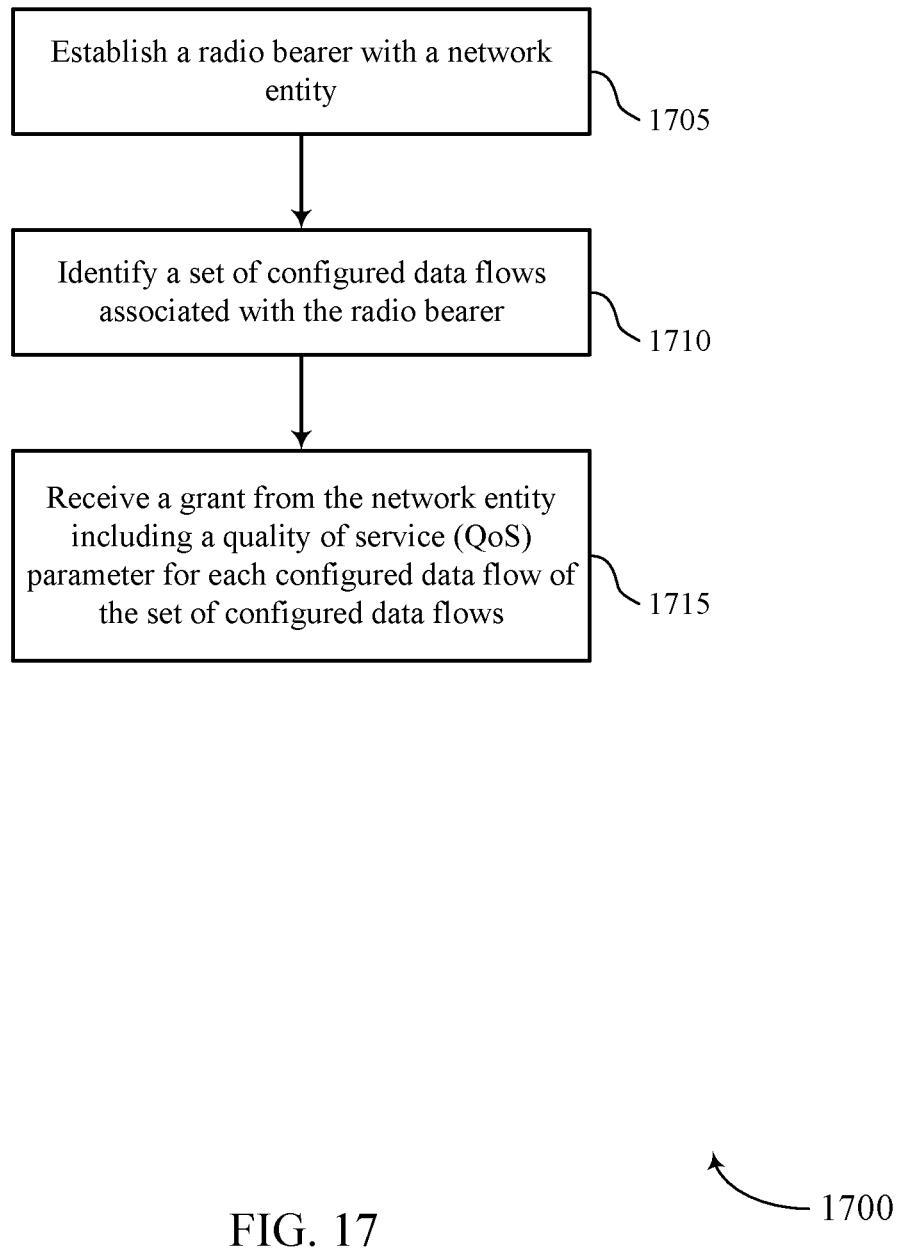

FIG. 17 shows a flowchart illustrating a method 1700 for QoS configurations for radio bearers with multiple data flows in accordance with aspects of the present disclosure. The operations of method 1700 may be implemented by a UE 115 or its components as described herein. For example, the operations of method 1700 may be performed by a UE radio bearer manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may establish a radio bearer with a network entity. The operations of block 1705 may be performed according to the methods described with reference to FIGS. 1 through 6. In certain examples, aspects of the operations of block 1705 may be performed by a radio bearer component as described with reference to FIGS. 7 through 10.

At block 1710 the UE 115 may identify a plurality of configured data flows associated with the radio bearer. The operations of block 1710 may be performed according to the methods described with reference to FIGS. 1 through 6. In certain examples, aspects of the operations of block 1710 may be performed by a data flow component as described with reference to FIGS. 7 through 10.

At block 1715 the UE 115 may receive a grant from the network entity comprising a QoS parameter for each configured data flow of the plurality of configured data flows. The operations of block 1715 may be performed according to the methods described with reference to FIGS. 1 through 6. In certain examples, aspects of the operations of block 1715 may be performed by a grant component as described with reference to FIGS. 7 through 10.

Figure 18:
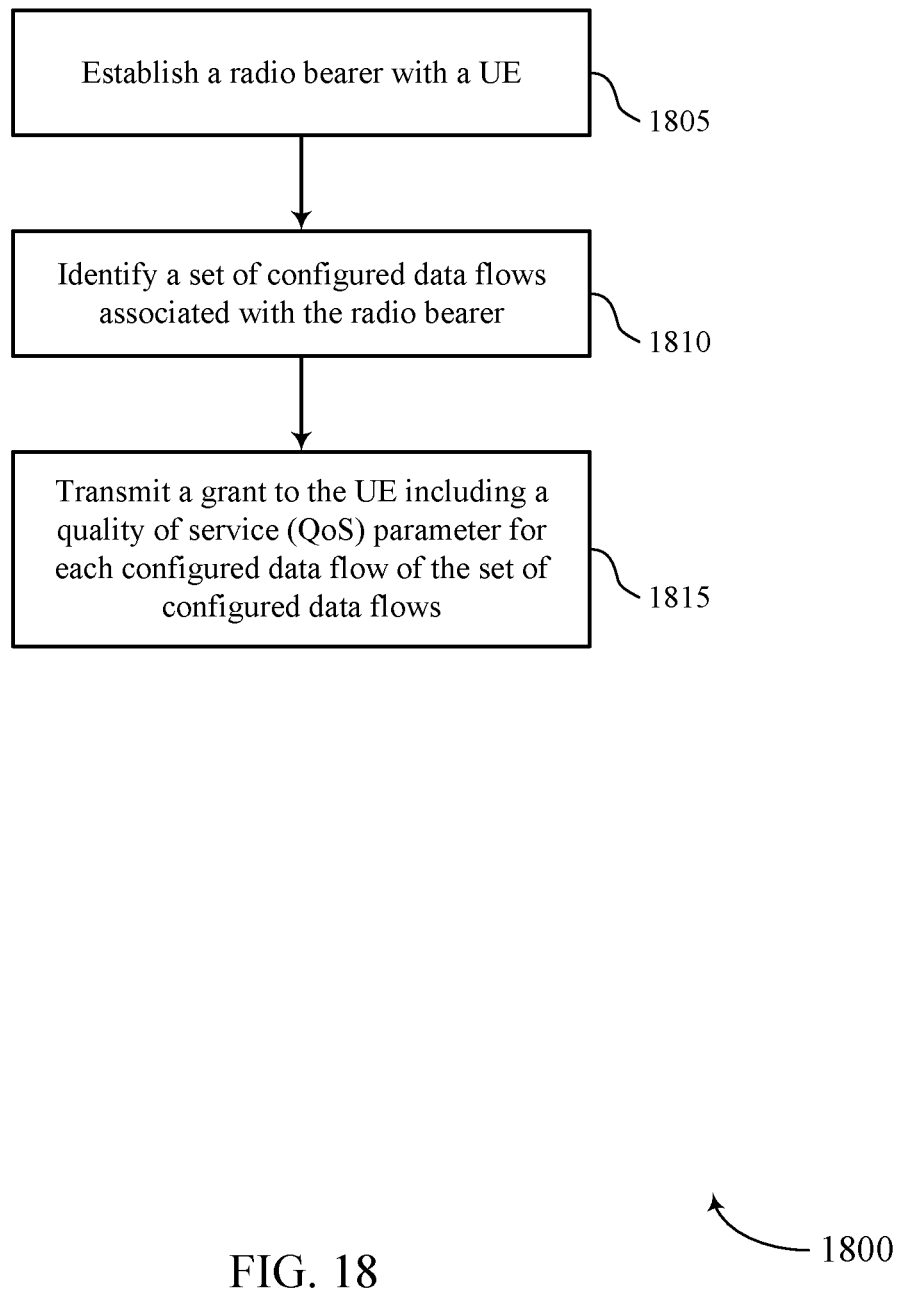

FIG. 18 shows a flowchart illustrating a method 1800 for QoS configurations for radio bearers with multiple data flows in accordance with aspects of the present disclosure. The operations of method 1800 may be implemented by a base station 105 or its components as described herein. For example, the operations of method 1800 may be performed by a base station radio bearer manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may establish a radio bearer with a UE 115. The operations of block 1805 may be performed according to the methods described with reference to FIGS. 1 through 6. In certain examples, aspects of the operations of block 1805 may be performed by a radio bearer component as described with reference to FIGS. 11 through 14.

At block 1810 the base station 105 may identify a plurality of configured data flows associated with the radio bearer. The operations of block 1810 may be performed according to the methods described with reference to FIGS. 1 through 6. In certain examples, aspects of the operations of block 1810 may be performed by a data flow component as described with reference to FIGS. 11 through 14.

At block 1815 the base station 105 may transmit a grant to the UE comprising a QoS parameter for each configured data flow of the plurality of configured data flows. The operations of block 1815 may be performed according to the methods described with reference to FIGS. 1 through 6. In certain examples, aspects of the operations of block 1815 may be performed by a grant component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS).

LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C.

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    establishing a radio bearer with a network entity;
    identifying a plurality of configured data flows mapped to the radio bearer; and
    receiving, from the network entity and after identifying the plurality of configured data flows mapped to the radio bearer, a grant for communications with the network entity, the grant indicating a respective quality of service (QoS) parameter and a respective time window for which the UE averages the respective QoS parameter for each configured data flow of the identified plurality of configured data flows mapped to the radio bearer.

2. The method of claim 1, wherein receiving the grant comprises:
    receiving an allocation of bits for a first configured data flow of the identified plurality of configured data flows and an allocation of bits for a second configured data flow of the identified plurality of configured data flows.

3. The method of claim 2, wherein the allocation of bits for the first configured data flow is configured to satisfy a first QoS priority level, and wherein the allocation of bits for the second configured data flow is configured to satisfy a second QoS priority level that is lower than the first QoS priority level.

4. The method of claim 3, wherein the first QoS priority level comprises a guaranteed bit rate (GBR) and the second QoS priority level comprises a non-GBR.

5. The method of claim 1, further comprising:
    scheduling data traffic associated with the radio bearer based at least in part on the respective time window for each configured data flow of the identified plurality of configured data flows.

6. A method for wireless communication at a network entity, comprising:
    establishing a radio bearer with a user equipment (UE);
    identifying a plurality of configured data flows mapped to the radio bearer; and
    transmitting, to the UE, a grant for communications with the UE, the grant indicating a respective quality of service (QoS) parameter and a respective time window for which the UE averages the respective QoS parameter for each configured data flow of the identified plurality of configured data flows mapped to the radio bearer.

7. The method of claim 6, wherein transmitting the grant comprises:
    transmitting an allocation of bits for a first configured data flow of the identified plurality of configured data flows and an allocation of bits for a second configured data flow of the identified plurality of configured data flows.

8. The method of claim 7, wherein the allocation of bits for the first configured data flow is configured to satisfy a first QoS priority level, and wherein the allocation of bits for the second configured data flow is configured to satisfy a second QoS priority level that is lower than the first QoS priority level.

9. The method of claim 8, wherein the first QoS priority level comprises a guaranteed bit rate (GBR) and the second QoS priority level comprises a non-GBR.

10. A user equipment (UE) for wireless communication comprising:
    one or more memories storing processor-executable code; and
    one or more processors coupled with the one or more memories and individually or collectively operable to execute the code to cause the UE to:
        establish a radio bearer with a network entity;
        identify a plurality of configured data flows mapped to the radio bearer; and
        receive, from the network entity and after identifying the plurality of configured data flows mapped to the radio bearer, a grant for communications with the network entity, the grant indicating a respective quality of service (QoS) parameter and a respective time window for which the UE averages the respective QoS parameter for each configured data flow of the identified plurality of configured data flows mapped to the radio bearer.

11. The UE of claim 10, wherein, to receive the grant, the one or more processors are individually or collectively operable to execute the code to cause the UE to:
receive an allocation of bits for a first configured data flow of the identified plurality of configured data flows and an allocation of bits for a second configured data flow of the identified plurality of configured data flows.

12. The UE of claim 11, wherein:
the allocation of bits for the first configured data flow is configured to satisfy a first QoS priority level, and
the allocation of bits for the second configured data flow is configured to satisfy a second QoS priority level that is lower than the first QoS priority level.

13. The UE of claim 12, wherein the first QoS priority level comprises a guaranteed bit rate (GBR) and the second QoS priority level comprises a non-GBR.

14. A network entity for wireless communication comprising:
one or more memories storing processor-executable code; and
one or more processors coupled with the one or more memories and individually or collectively operable to execute the code to cause the network entity to:
establish a radio bearer with a user equipment (UE);
identify a plurality of configured data flows mapped to the radio bearer; and
transmit, to the UE and after identifying the plurality of configured data flows mapped to the radio bearer, a grant for communications with the UE, the grant indicating a respective quality of service (QoS) parameter and a respective time window for which the UE averages the respective QoS parameter for each configured data flow of the identified plurality of configured data flows mapped to the radio bearer.

15. The network entity of claim 14, wherein, to transmit the grant, the one or more processors are individually or collectively operable to execute the code to cause the network entity to:
transmit an allocation of bits for a first configured data flow of the identified plurality of configured data flows and an allocation of bits for a second configured data flow of the identified plurality of configured data flows.

16. The network entity of claim 15, wherein:
the allocation of bits for the first configured data flow is configured to satisfy a first QoS priority level, and the allocation of bits for the second configured data flow is configured to satisfy a second QoS priority level that is lower than the first QoS priority level.

17. The network entity of claim 16, wherein the first QoS priority level comprises a guaranteed bit rate (GBR) and the second QoS priority level comprises a non-GBR.

* * * * *